US009265055B2

(12) United States Patent  
Okuda

(10) Patent No.: US 9,265,055 B2  
(45) Date of Patent: Feb. 16, 2016

(54) BASE STATION APPARATUS AND WIRELESS TERMINAL APPARATUS

(71) Applicant: FUJITSU LIMITED, Kawasaki-shi, Kanagawa (JP)

(72) Inventor: Masato Okuda, Tokorozawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/933,693

(22) Filed: Jul. 2, 2013

(65) Prior Publication Data  
US 2014/0029527 A1 Jan. 30, 2014

(30) Foreign Application Priority Data

Jul. 27, 2012 (JP) ................................. 2012-167443

(51) Int. Cl.  
*H04L 5/12* (2006.01)  
*H04W 72/08* (2009.01)  
*H04L 1/00* (2006.01)  
*H04W 76/02* (2009.01)  
*H04L 12/709* (2013.01)

(52) U.S. Cl.  
CPC ............ *H04W 72/085* (2013.01); *H04L 1/0002* (2013.01); *H04W 76/025* (2013.01); *H04L 45/245* (2013.01); *H04L 2001/0096* (2013.01)

(58) Field of Classification Search  
CPC ............ H04L 2209/84; H04L 49/9057; H04L 5/0055; H04L 9/085; H04L 45/245; H04W 76/025  
USPC ......... 370/329, 235, 229, 328, 401, 419, 468; 455/445, 501, 550.1  
See application file for complete search history.

(56) References Cited

U.S. PATENT DOCUMENTS

| | | | |
|---|---|---|---|
| 7,676,223 B2 * | 3/2010 | Das et al. | .................... 455/422.1 |
| 7,693,130 B2 * | 4/2010 | Barry et al. | ................... 370/350 |
| 7,787,370 B1 | 8/2010 | Aweya et al. | |
| 8,023,410 B2 * | 9/2011 | O'Neill | ........................ 370/235 |

(Continued)

FOREIGN PATENT DOCUMENTS

| | | |
|---|---|---|
| GB | 2482118 A | 1/2012 |
| JP | 2009-246875 A | 10/2009 |

(Continued)

OTHER PUBLICATIONS

United Kingdom Search Report, United Kingdom Patent Applicaiton No. 1311835.1 dated Jan. 9, 2014.

*Primary Examiner* — Shaq Taha  
(74) *Attorney, Agent, or Firm* — Arent Fox LLP

(57) ABSTRACT

A base station apparatus including: a processor configured to extract an specified packet flow among packet flows which are to be transmitted by using a link aggregation of a first radio link and a second radio link, to generate encapsulated packets by adding a link aggregation information to reception packets which are included in the specified packet flow, the link aggregation information indicating that the specified packet flow are to be transmitted by using the link aggregation, and to control the first wireless interface and the second wireless interface such that the encapsulated packets are transmitted by the link aggregation, based on a distribution of the encapsulated packets between the first radio link and the second radio link being determined based on radio qualities, and such that the reception packets which are not included in the specified packet flow are transmitted via the first radio link.

16 Claims, 25 Drawing Sheets

(56) References Cited

U.S. PATENT DOCUMENTS

| | | | |
|---|---|---|---|
| 8,442,070 B1* | 5/2013 | Go et al. | 370/473 |
| 8,600,436 B2* | 12/2013 | Haartsen | 455/552.1 |
| 2007/0207811 A1* | 9/2007 | Das et al. | 455/450 |
| 2010/0014534 A1* | 1/2010 | Bennett | 370/401 |
| 2012/0163309 A1* | 6/2012 | Ma et al. | 370/329 |
| 2012/0163437 A1* | 6/2012 | Frederiksen et al. | 375/224 |
| 2012/0170507 A1* | 7/2012 | Sawai | 370/315 |
| 2013/0177023 A1* | 7/2013 | Salinger et al. | 370/401 |
| 2013/0242897 A1* | 9/2013 | Meylan et al. | 370/329 |
| 2013/0272121 A1* | 10/2013 | Stanwood et al. | 370/230 |

FOREIGN PATENT DOCUMENTS

| | | |
|---|---|---|
| JP | 2011-061253 A | 3/2011 |
| JP | 2011-142602 A | 7/2011 |
| WO | WO 2012/052791 A1 | 4/2012 |
| WO | WO 2013/138046 A1 | 9/2013 |

* cited by examiner

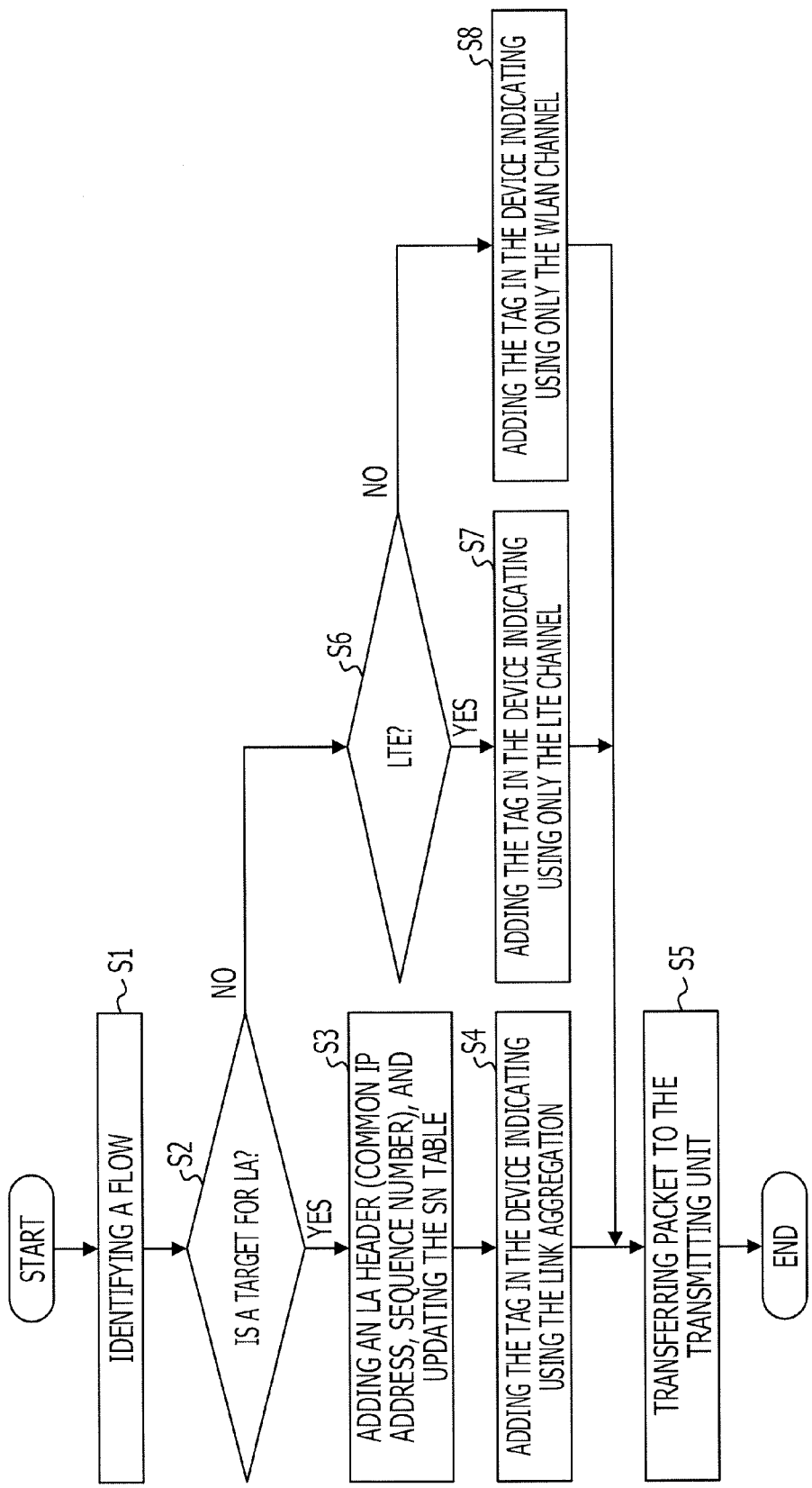

FIG. 7A

| IP ADDRESS | PORT NUMBER | FLOW ID | TX MODE |
|---|---|---|---|
| IP#a | Port#A | 1 | LA |
| IP#b | Port#B | 2 | LTE |
| IP#c | Port#C | 3 | WLAN |

FIG. 7B

| FLOW ID | SEQUENCE NUMBER |
|---|---|
| 1 | 344 |
| ⋮ | ⋮ |

FIG. 11

| FLOW ID | NEXT SEQUENCE NUMBER |
|---------|---------------------|
| 1 | 344 |
| ⋮ | ⋮ |

FIG. 22

| IP ADDRESS | PORT NUMBER | FLOW ID | TX MODE | LTE | |
|---|---|---|---|---|---|
| | | | | LTE | WiFi |
| IP#a | Port#A | 1 | LA | #A | #B |
| IP#b | Port#B | 2 | LTE | #A | − |
| IP#c | Port#C | 3 | WLAN | − | #B |

BASE STATION APPARATUS AND WIRELESS TERMINAL APPARATUS

CROSS-REFERENCE TO RELATED APPLICATION

This application is based upon and claims the benefit of priority of the prior Japanese Patent Application No. 2012-167443 filed on Jul. 27, 2012, the entire contents of which are incorporated herein by reference.

FIELD

The present invention relates to a base station apparatus and a wireless terminal apparatus.

BACKGROUND

Recently, it becomes possible to use various wireless communication access systems due to an advancement in a wireless communication technology. A cellular communication system, such as W-CDMA (Wideband Code Division Multiple Access) or LTE (Long Term Evolution), used as a mobile wireless communication system, WiMAX (Worldwide Interoperability for Microwave Access) based on the IEEE802.16 technology, and a wireless LAN in conformity with the IEEE802.11 technology, may be included as the principal wireless communication systems.

Wireless terminals equipped with a communication interface for communicating with a plurality of wireless communication access systems have been widely distributed in order to meet the demand for mobile communication or due to the advancement in implementation technology of a terminal. A representative wireless terminal includes a smart phone and a tablet PC each includes a dual terminal generally having both wireless communication interfaces for the cellular communication system and the wireless LAN. The dual terminal generally selects and uses any one of the wireless access channels of the cellular communication system and the wireless LAN according to the quality of radiowave in the respective wireless access channels. In the meantime, a technology has been emerged that enables a higher speed communication through the concurrent use of a plurality of different wireless access channels. See, for example, Japanese Laid-Open Patent Publication No. 2011-142602, No. 2009-246875, and No. 2011-61253.

FIG. 1 illustrates a block diagram of an exemplary configuration of a conventional wireless communication system. In FIG. 1, an interface 11 at core network side of a base station apparatus 10 is coupled with a core network to transmit/receive communication data to/from the core network. A virtual MAC processing unit 12 performs a processing for establishing a link using a virtual MAC address and establishes a link with a virtual MAC processing unit 22 using the virtual MAC address. Further, the virtual MAC processing unit 12 generates a frame to be transferred using the link. A switching unit 13 distributes link frames sent from the virtual MAC processing unit 12 to each wireless module 14a, 14b, 14c, and outputs the link frames supplied from each wireless module 14a, 14b, 14c to the virtual MAC processing unit 12.

The macrocell wireless module 14a performs a wireless communication with a macrocell wireless module 24a of a mobile station device 20 through the 3G (3rd Generation) or LTE. The macrocell wireless module 14b performs a wireless communication with a macrocell wireless module 24b through the WiMAX. The picocell wireless module 14c performs a wireless communication with a picocell wireless module 24c through the wireless LAN. A wireless environment recognition unit 15 recognizes the wireless environment and indicates a destination to which a link frame, which is input from the virtual MAC processing unit 12, is to be distributed, to a switching unit 13 based on the recognition result.

The mobile station device 20 serving as a wireless terminal apparatus employs substantially the same configuration as the base station apparatus 10. An interface 21 at a user network side of the mobile station device 20 performs a processing for a network layer. Further, the mobile station device 20 includes, but is not limited to, a virtual MAC processing unit 22. The mobile station device 20 controls the switching unit 23 to select an optimum wireless module from the wireless modules 24a, 24b, 24c based on information such as the communication quality acquired by a wireless environment recognition unit 25.

FIG. 2 illustrates the configuration in which a plurality of wireless access systems are coupled with each other to form a network. In FIG. 2, a WiFi access network 33 is coupled to a cellular network constituted with a macro wireless access network 31 and an operator core network 32. In FIG. 2, a wireless terminal apparatus 34 accesses the macro wireless access network 31 as well as the WiFi access network 33 through the wireless access channel of, for example, the W-CDMA. Also, the wireless terminal apparatus 34 may set two connections using a mobile IP technology, that is, one connection to the macro wireless access network 31 via a path from an HA (Home Agent) 35, which belongs to the operator core network 32, and the other connection to the WiFi access network 33 via another path from the HA 35, thereby making traffic flows that are different from each other to pass through.

Further, in addition to a macro base station installed at a building rooftop or a steel tower to cover an area with the radius of several kilometers, a femtocell base station which is installed in an indoor of, for example, a house to cover an area with the radius of about 10 meters is being distributed in the cellular communication system. A product in which a wireless LAN interface is equipped in the femtocell base station makes an appearance as well.

SUMMARY

According to an aspect of the invention, a base station apparatus including: a first wireless interface configured to communicate with a wireless terminal apparatus via a first radio link, a second wireless interface configured to communicate with the wireless terminal apparatus via a second radio link, a network interface configured to receive packet flows from a core network, each of the packet flows including reception packets, and a processor configured to extract an specified packet flow among the packet flows which are to be transmitted by using a link aggregation of the first radio link and the second radio link, to generate encapsulated packets by adding a link aggregation information to the reception packets which are included in the specified packet flow, the link aggregation information indicating that the specified packet flow are to be transmitted by using the link aggregation, to acquire a first radio quality of the first radio link and a second radio quality of the second radio link, and to control the first wireless interface and the second wireless interface such that the encapsulated packets are transmitted by the link aggregation of the first radio link and the second radio link, based on a distribution of the encapsulated packets between the first radio link and the second radio link being determined based on the first radio quality and the second radio quality, and such that the reception packets which are not included in the specified packet flow are transmitted via the first radio link.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a flowchart illustrating a first embodiment of a flow identification process.

FIGS. 7A and 7B are views illustrating a flow table and an SN table, respectively.

FIG. 11 is a view illustrating a Next SN table.

FIG. 22 is a view illustrating a flow table.

DESCRIPTION OF EMBODIMENTS

When both wireless channels of the wireless LAN and the LTE are used in a femtocell base station such as an LTE femtocell base station provided with a wireless LAN interface, the following problems to be solved exist.

Figure 1:
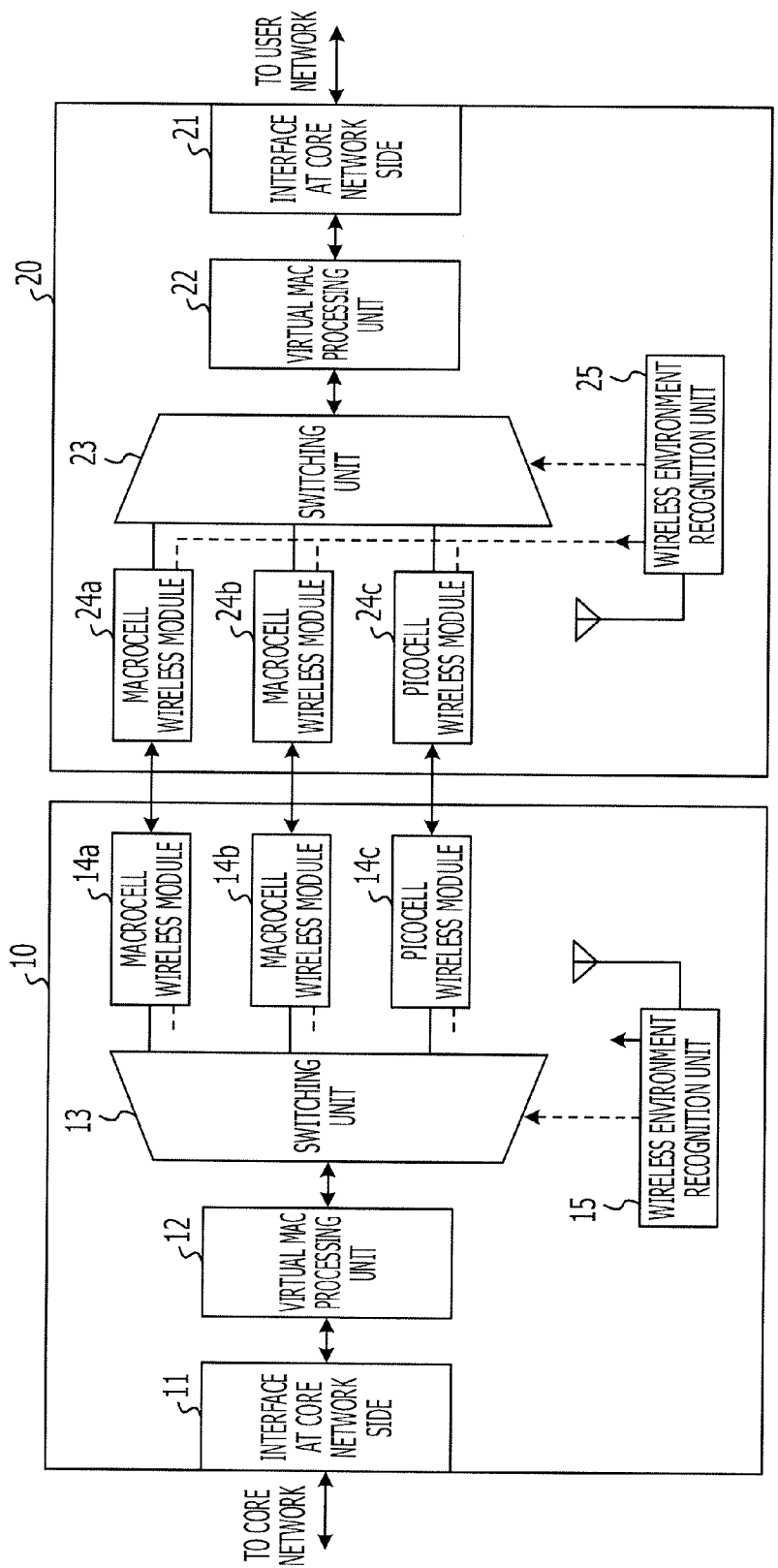
FIG. 1 is a block diagram illustrating an exemplary configuration of a conventional wireless communication system.

Since the femtocell base station is installed in an indoor of, for example, a house, a wireless terminal apparatus is required to be provided with a function to access the Internet or a home network, in addition to a function to access the mobile operator network. In this case, for example, there may be a demand for the simultaneous use of the LTE and the wireless LAN via the communication within a home network. The concurrent utilization of the LTE channel and the wireless LAN channel is far more effective since there is no bottleneck as in a broadband network. As in the related art, when a packet distribution is performed with a base station apparatus 10 shown in FIG. 1 or an operator core network 32 shown in FIG. 2, a distribution point is outside of the home network. For this reason, there is a problem in that an aggregation functionality may not be provided to both of the traffic for the mobile operator network and the traffic within the home network.

Figure 2:
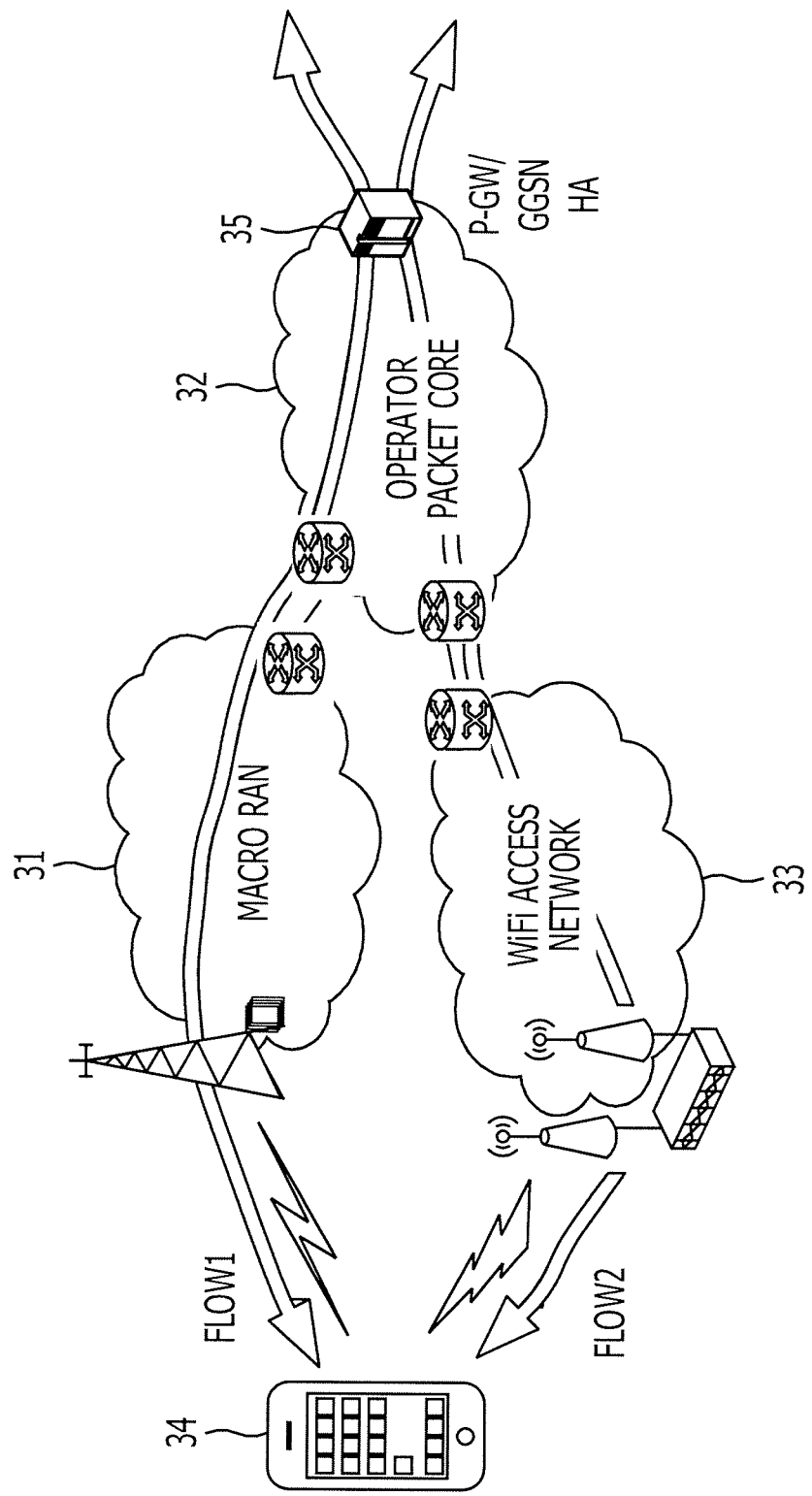
FIG. 2 is a diagram illustrating a configuration in which a plurality of wireless access systems are coupled with each other to form a network.

As illustrated in FIG. 2, when the packets are distributed to the LTE and the wireless LAN from an upstream of the network, the determination regarding the distribution is performed at the upstream of the network. For this reason, although communication is finally made with the wireless terminal apparatus via a femtocell base station equipped with a wireless LAN-IF, the packet distribution may not be performed corresponding to the wireless channel condition (e.g., the degree of congestion or the wireless signal quality) of each of the LTE channel and the wireless LAN channel between the femtocell base station and the wireless terminal apparatus. Therefore, for example, in a case where the wireless LAN is in a congested state or the quality of the wireless LAN has been degraded, there may be a case where the communication rate via the wireless LAN channel becomes slower, while there is a room for the traffic in the LTE channel side. Further, in a case where the sequence of packets that arrive from the LTE channel and the wireless LAN channel is arranged with the wireless terminal apparatus, when, for example, the delay in the wireless LAN channel is large, the delay of the packet sequence arrangement increases and the end-to-end delay also increases to become a factor of the degradation of a communication quality.

The disclosed base station apparatus intends to perform a packet distribution according to the condition of each wireless channel.

Hereinafter, embodiments will be described based on the accompanying drawings.

First Embodiment: Configuration of Femtocell Base Station Apparatus

Figure 3:
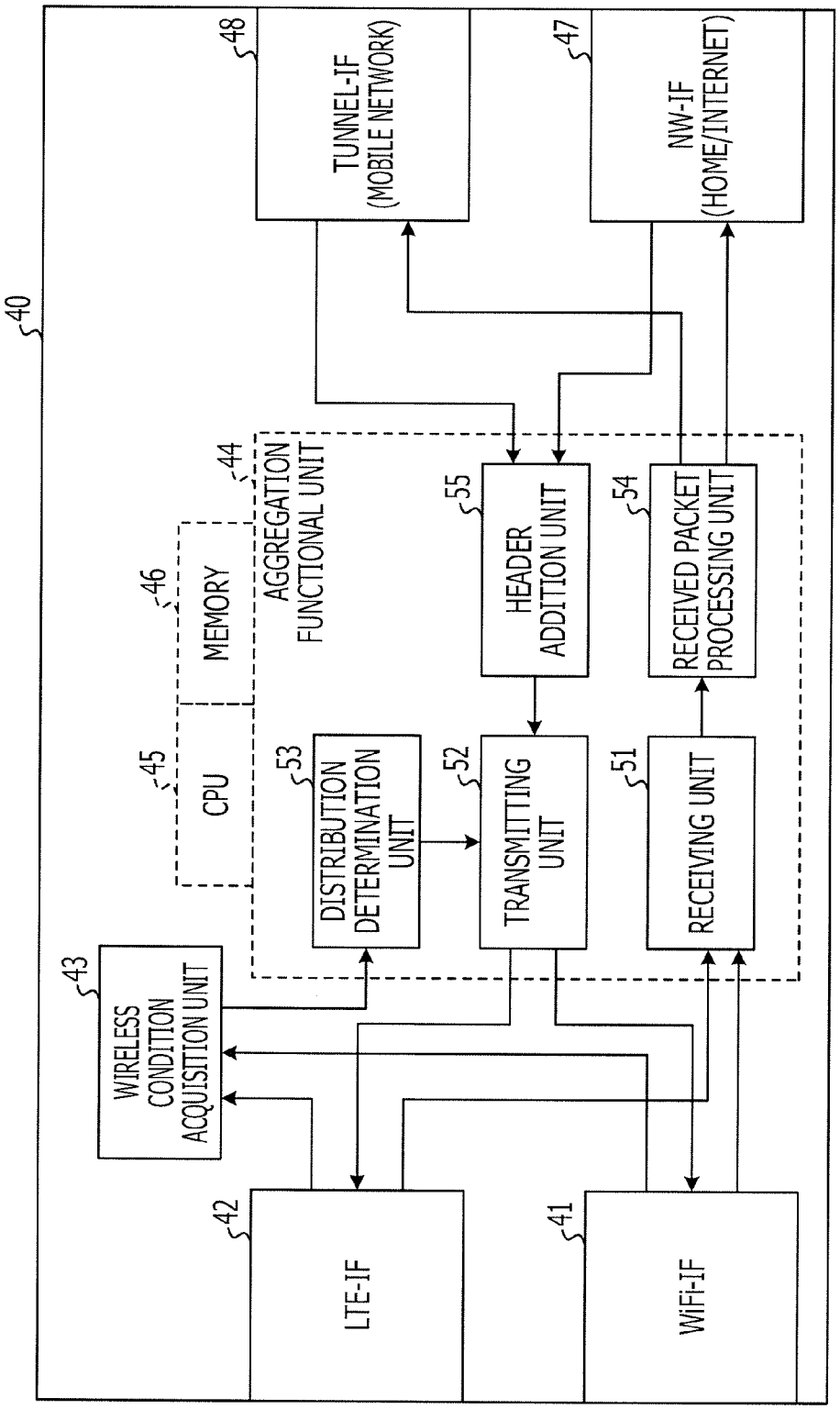
FIG. 3 is a block diagram illustrating a configuration of a first embodiment of a femtocell base station apparatus.

FIG. 3 illustrates the configuration of a first embodiment of a femtocell base station apparatus. In FIG. 3, a WiFi-IF 41 of a femtocell base station apparatus 40 is a wireless LAN (WLAN) interface, and is wirelessly coupled with a wireless LAN interface of a wireless terminal apparatus. An LTE-IF 42 is wirelessly coupled with an LTE interface of the wireless terminal apparatus. The WiFi-IF 41 and the LTE-IF 42 notify a wireless condition acquisition unit 43 of wireless channel conditions of the wireless LAN channel and the LTE channel, respectively. In addition, the WiFi-IF 41 and the LTE-IF 42 supply the packets received from the wireless terminal apparatus to a receiving unit 51 within an aggregation functional unit 44, and transmits the packets received from a transmitting unit 52 within the aggregation functional unit 44 to the wireless terminal apparatus via the wireless LAN channel and the LTE channel.

The wireless condition acquisition unit 43 collects the quality of the wireless channel (e.g., Signal to Noise Ratio (SNR)) and a congestion situation (e.g., usage rate of a channel) measured at each of the WiFi-IF 41 and LTE-IF 42, and notifies a distribution determination unit 53 within the aggregation functional unit 44 of the measured quality of the wireless channel and the congestion situation.

The aggregation functional unit 44 is constituted with, for example, a CPU 45 and a memory 46, and the CPU 45 executes programs stored in the memory 46 to perform the processing to be performed by each of the receiving unit 51, the transmitting unit 52, the distribution determination unit 53, a received packet processing unit 54, and a header addition unit 55.

The receiving unit 51 performs, for example, an error check for the packets received from the wireless LAN channel and the LTE channel, and transfers the packets to the received packet processing unit 54. The received packet processing unit 54 rearranges the sequence of the packets based on a sequence number (SN) added to the packets received from the wireless LAN channel and the LTE channel. Also, the received packet processing unit 54 distributes the packets to a NW-IF (a network interface) 47 for the home network or the like and a tunnel-IF (a tunnel interface) 48 for a mobile operator network based on a destination address within a packet header. Further, the tunnel interface is a virtual interface defined in a network interface.

Each of the network interface 47 and the tunnel interface 48 transmits the packets delivered from the received packet processing unit 54 to an upper level communication node. In addition, each of the network interface 47 and the tunnel interface 48 transfers the packets received from the upper level communication node to a header addition unit 55.

Figure 4A:
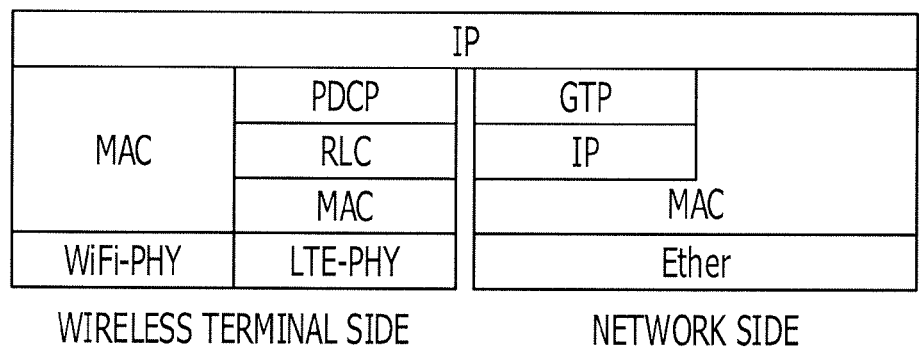
FIGS. 4A and 4B are views for explaining a GTP tunnel.
Figure 4B:
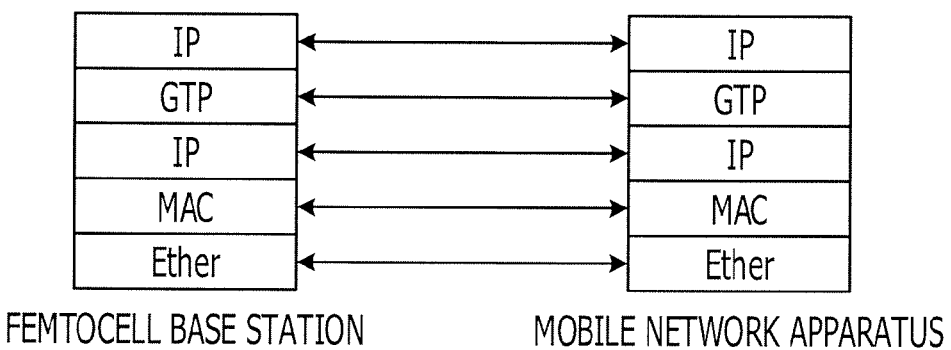

Here, reference is made to FIG. 4A illustrating a protocol stack of a femtocell base station apparatus. The packets received from the LTE-IF 42 or the WiFi-IF 41 at a wireless terminal apparatus side are transferred to an IP layer (routing layer) to undergo an IP routing in which a source interface is selected using a destination IP address. At the network side, a GTP (GPRS Tunneling Protocol) tunnel is regarded as a logical interface for coupling to a mobile network, and a MAC interface is regarded as an interface for directly coupling to a local network.

The header addition unit 55 determines, based on header information of the received packets, whether the packets received from the network interface 47 and the tunnel interface 48 use one of the LTE channel and the wireless LAN channel or both of the LTE channel and the wireless LAN channel. Then, the header addition unit 55 associates information of the determination result to the packets as a tag in the device. In addition, when the LTE channel and the wireless LAN are utilized simultaneously, the header addition unit 55 adds an LA header including an SN and an IP address which is common to packet flows utilized simultaneously, to the packets and transmits the packets added with the LA header to the transmitting unit 52. Further, LA is an abbreviation for Link Aggregation.

The header addition unit 55 determines whether the packets received from the network interface 47 and the tunnel interface 48 use either any one of or both the LTE channel and the wireless LAN channel, and associates information of the determination result to the packets as a tag in the device. In addition, when the LTE channel and the wireless LAN are utilized simultaneously, the header addition unit 55 adds an LA header including an SN and an IP address which is common to a packet flow utilized simultaneously, to the packets and transmits the LA header added packets to the transmitting unit 52. Further, LA is an abbreviation for Link Aggregation.

The transmitting unit 52 refers to the tag in the device delivered from the header addition unit 55, and determines whether the associated packets use either any one of or both of the LTE channel and the wireless LAN channel. When it is determined that the associated packets use any one of the LTE channel and the wireless LAN channel, the transmitting unit 52 transfers the packets to a wireless channel interface indicated by the tag in the device. In the meantime, when both lines are utilized simultaneously, the transmitting unit 52 determines a wireless channel interface for use in transferring the packets based on information from the distribution determination unit 53, and transfers the packets to the determined wireless channel interface. In this case, the distribution determination unit 53 selects a wireless channel for use in packet transfer for each packet based on information from the wireless condition acquisition unit 43, and notifies the transmitting unit 52 of selected wireless channel.

The tag in the device has a two-bit configuration, and "01" indicates a packet flow to be transmitted only to the LTE channel and "10" indicates a packet flow to be transmitted only to the wireless LAN channel. Further, "11" indicates a packet of a target flow targeted for a link aggregation to be transmitted to both the LTE channel and the wireless LAN channel. A reserved tag is indicated as "00". The tag in the device may travel in parallel with a packet as a signal line, and may be added to the front end of a packet.

Figure 5:
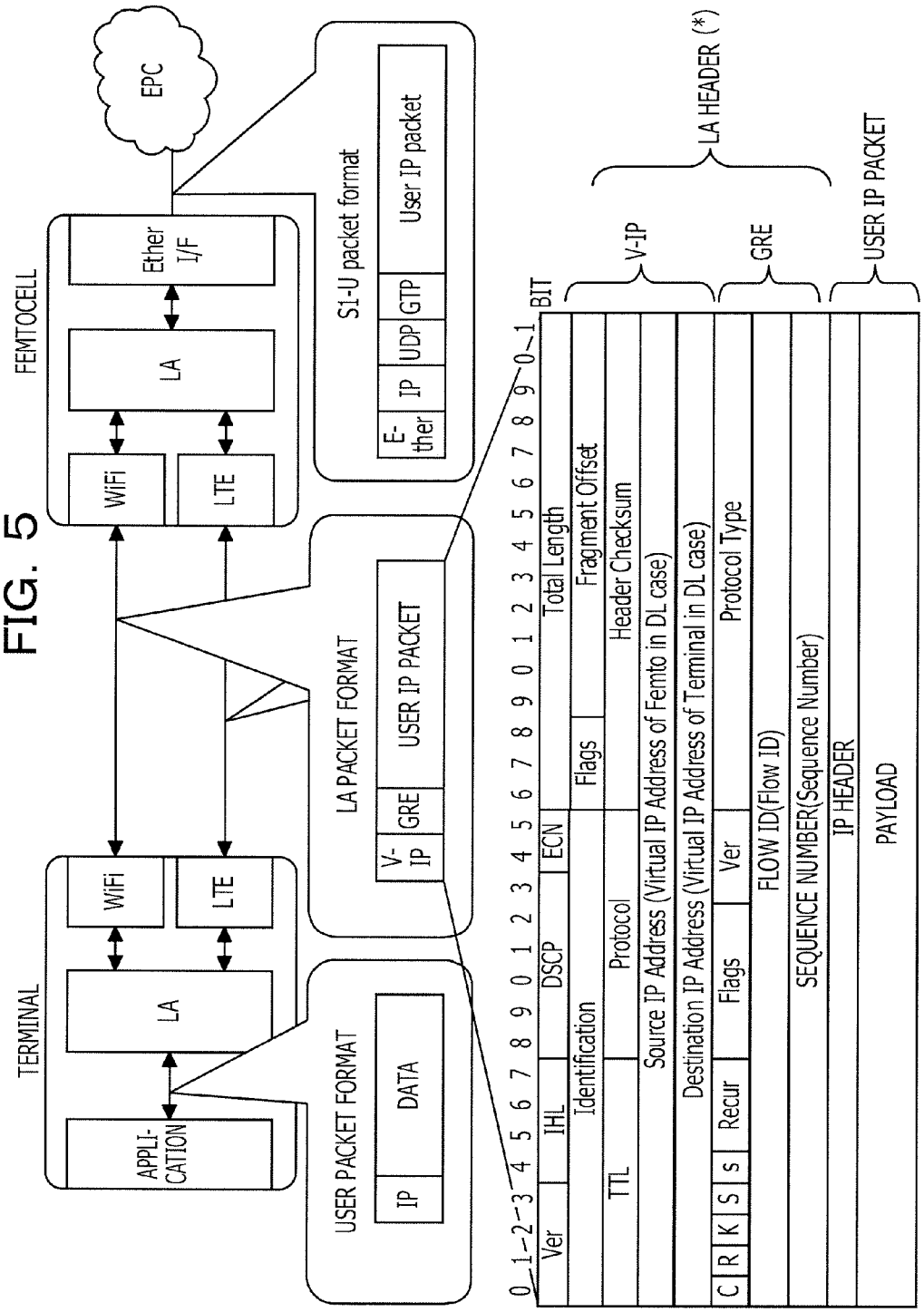
FIG. 5 is a view illustrating the format of an IP packet provided with an LA header.

FIG. 5 illustrates the format of an IP packet added with an LA header. The LA header includes a 20-byte V-IP (Virtual-Internet Protocol), a 12-byte GRE (Generic Routing Encapsulation) and a user IP packet. The V-IP and the GRE constitute the LA header. The source IP address and the destination IP address of the V-IP are the IP address of a target flow for a link aggregation. The flow ID and the SN are placed in the GRE. The flow ID is used for identifying a packet flow, and the SN indicates a reception sequence or a transmission sequence of the packet for each packet flow. Further, a user IP packet, that is, an original packet includes an IP header and a payload.

First Embodiment of Flow Identification Process

FIG. 6 is a flowchart illustrating the first embodiment of a flow identification process performed by the header addition unit 55. The process begins when a received packet is supplied to the header addition unit 55. In FIG. 6, at step 51, the header addition unit 55 retrieves the flow table illustrated in FIG. 7A using a destination IP address and a port number included in the header of the received packet to obtain the flow ID and the transmission mode (Tx mode) used for identifying a packet flow.

In FIG. 7A, the flow ID is used for identifying the packet flow. The Tx mode is used for determining whether a link aggregation (LA) is to be performed, whether only the LTE channel is to be used (LTE), or whether only the wireless LAN channel is to be used. The flow table is maintained in the memory 46. Further, when the first packet of a packet flow having the destination IP address same as the port number is supplied, a flow ID and a Tx mode are determined from the destination IP address and the port number, and each of the entries in the flow table is set in the flow table.

For example, an LA is set to be performed for a packet flow having a destination IP address and a port number that uses a FTP (File Transfer Protocol) or a HTTP (Hypertext Transfer Protocol). Further, it may be considered that the LTE is set to the packet flow having a destination IP address and a port number that use the Video Streaming or the (VoIP) that is strict to the QoS or delay, and besides these packet flows, the WLAN is set for the best effort traffic flow.

At step S2, the header addition unit 55 determines whether the Tx mode of the received packet obtained at step S1 is the LA. When it is determined that the Tx mode is the LA, at step S3, the header addition unit 55 adds an LA header including a common IP address and an SN to the received packet, and updates the SN of a SN table illustrated in FIG. 7B. As illustrated in FIG. 7B, the SN table maintains the SN for each flow ID, and is maintained in the memory 46.

Subsequently, the header addition unit 55 adds the tag in the device "11" indicating using the link aggregation to the packet at step S4, and transfers the packet to the transmitting unit 52 at step S5.

Meanwhile, when it is determined that the Tx mode of the received packet is the LTE or the WLAN at step S2, it is determined whether the Tx mode of the received packet is the LTE or the WLAN at step S6. When the Tx mode is the LTE, the header addition unit 55 adds the tag in the device "01" indicating using only the LTE channel to the packet at step S7, and transfers the packet to the transmitting unit 52 at step S5. Further, when it is determined that the Tx mode of the received packet is the WLAN at step S6, the header addition unit 55 adds the tag in the device "10" indicating using only the WLAN channel to the packet at step S8, and transfers the packet to the transmitting unit 52 at step S5.

Distribution Determination Process

Figure 8A:
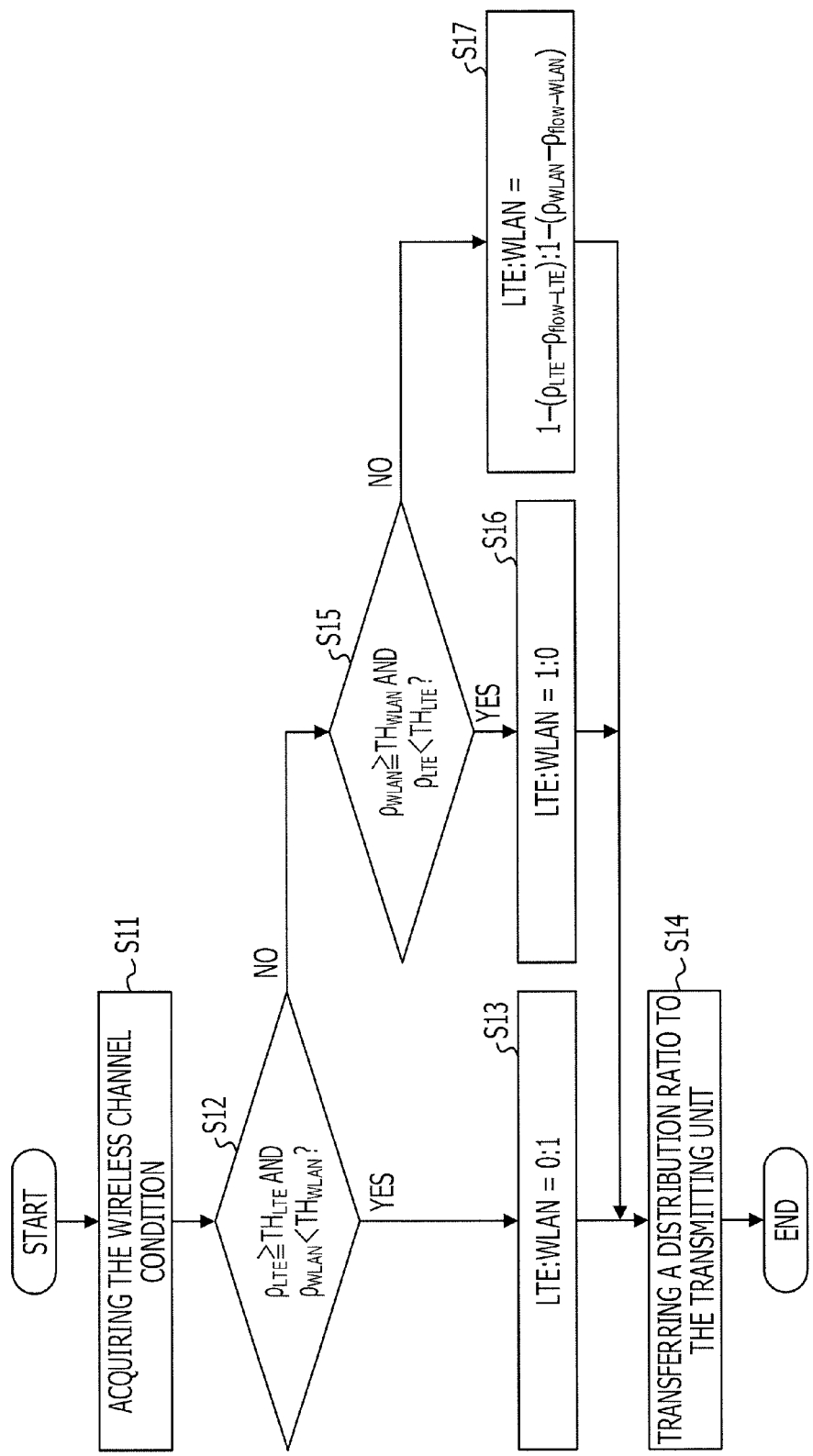
FIG. 8A is a flowchart illustrating a first embodiment of a distribution determination process.

FIG. 8A is a flowchart illustrating the first embodiment of a distribution determination process performed by the distribution determination unit 53. Here, $\rho_{LTE}$ is the usage rate of the entire LTE channel, $\rho_{WLAN}$ is the usage rate of the entire WLAN channel, $\rho_{flow-LTE}$ is the usage rate of the LTE channel in the flow, and $\rho_{flow-WLAN}$ is the usage rate of the WLAN channel in the flow. Further, $TH_{LTE}$ is defined as a threshold value (e.g., about 80%) of the usage rate of the LTE channel and $TH_{WLAN}$ is defined as a threshold value (e.g., about 40%) of the usage rate of the WLAN channel.

In FIG. 8A, the distribution determination unit 53 acquires the wireless channel condition of the WLAN channel and the LTE channel from the wireless condition acquisition unit 43 at step S11. At step S12, the distribution determination unit 53 determines whether the usage rate of the entire LTE channel $\rho_{LTE}$ is the threshold value $TH_{LTE}$ or more and the usage rate of the entire WLAN channel $\rho_{WLAN}$ is less than the threshold value $TH_{WLAN}$. When it is determined that $\rho_{LTE} \geq TH_{LTE}$ and $\rho_{WLAN} < TH_{WLAN}$, the distribution determination unit 53 sets a distribution ratio (LTE:WLAN=0:1), that is, sets a packet transfer with only by the WLAN channel at step S13, and transfers the distribution ratio to the transmitting unit 52 at step S14.

When it is determined that $\rho_{LTE} < TH_{LTE}$ or $\rho_{WLAN} \geq TH_{WLAN}$ at step S12, it is determined whether $\rho_{WLAN} \geq TH_{WLAN}$ and $\rho_{LTE} < TH_{LTE}$ at step S15. Here, when it is determined that $\rho_{LTE} \geq TH_{LTE}$ and $\rho_{WLAN} < TH_{WLAN}$, the distribution determination unit 53 sets a distribution ratio (LTE:WLAN=1:0), that is, sets a packet transfer with only by the LTE channel at step S16, and transfers the distribution ratio to the transmitting unit 52 at step S14.

Meanwhile, when it is determined that $\rho_{WLAN} < TH_{WLAN}$ or $\rho_{LTE} \geq TH_{LTE}$ at step S15, the distribution determination unit 53 sets a distribution ratio (LTE:WLAN=1−($\rho_{LTE}$−$\rho_{flow-LTE}$):1−($\rho_{WLAN}$−$\rho_{flow-WLAN}$)), at step S17, and transfers the distribution ratio to the transmitting unit 52 at step S14. Further, FIG. 9 illustrates an image for a distribution ratio at each wireless channel usage rate according to the flowchart of FIG. 8.

Further, in the embodiment described above, the distribution ratio (LTE:WLAN) is determined according to the usage rate of each wireless channel, that is, a congestion situation, but the distribution ratio (LTE:WLAN) may be determined by further considering the quality of each wireless channel.

Figure 8B:
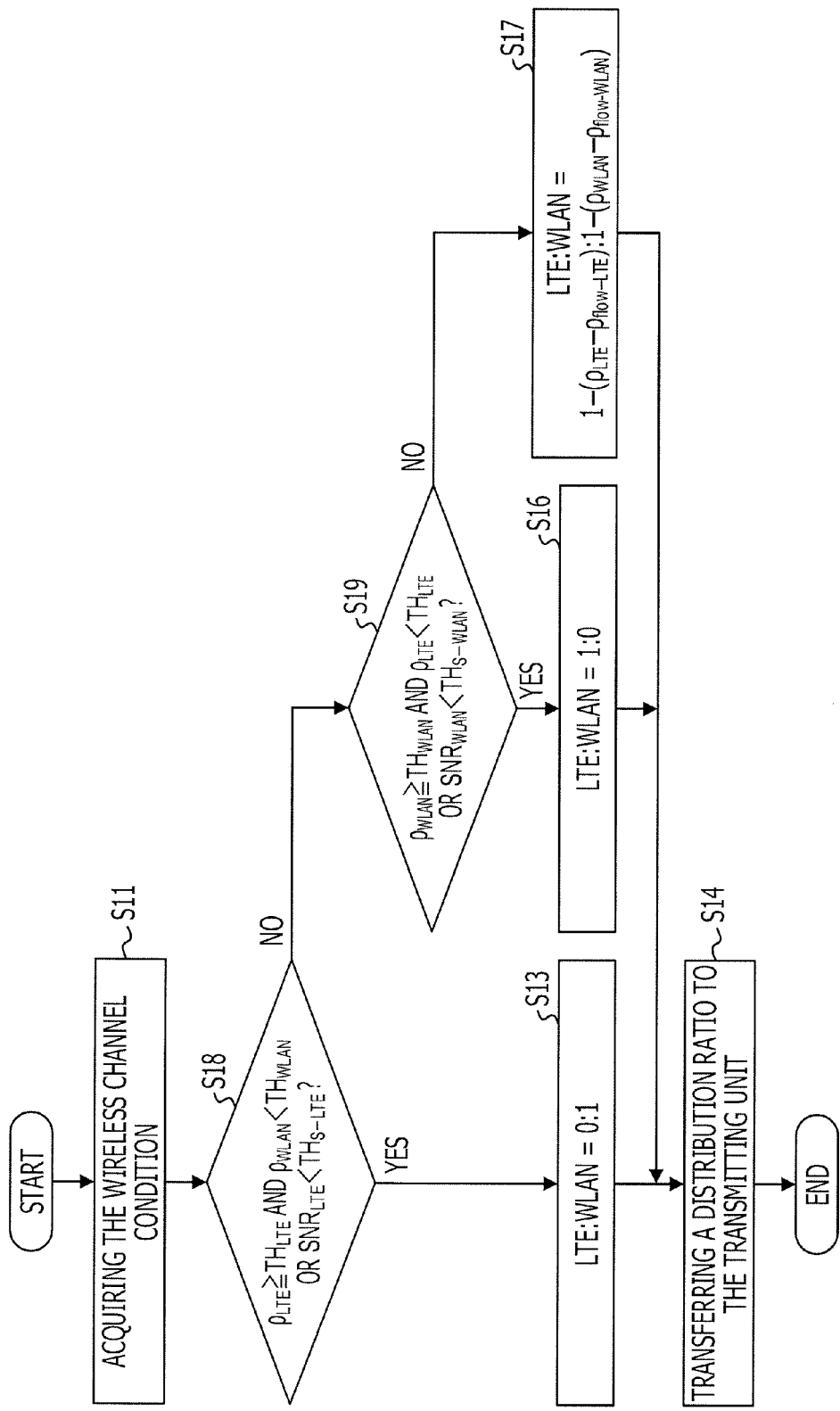
FIG. 8B is a flowchart illustrating a modified example of the first embodiment of the distribution determination process.
Figure 9:
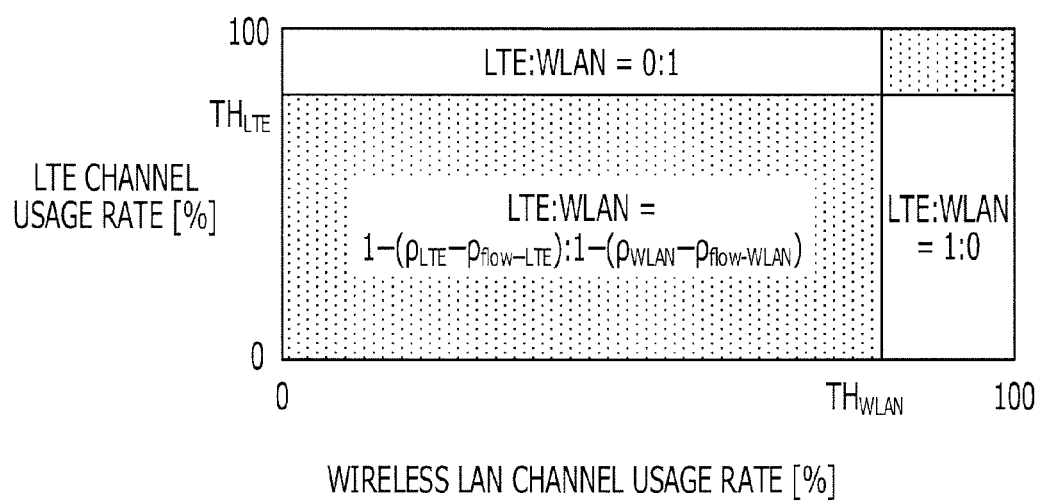
FIG. 9 is a view illustrating an image for a distribution ratio at each wireless channel usage rate.

FIG. 8B illustrates a flowchart illustrating a modification of the first embodiment of a distribution determination process performed by the distribution determination unit 53. Here, $SNR_{LTE}$ is a wireless signal quality (SNR; signal to noise ratio) of the LTE channel, $TH_{S-LTE}$ is the lowest SNR for communicating across the LTE channel, $SNR_{WLAN}$ is the SNR of the WLAN channel, and $TH_{S-WLAN}$ is the lowest SNR for communicating across the WLAN channel.

In FIG. 8B, the distribution determination unit 53 acquires the wireless channel condition of the WLAN channel and the LTE channel from the wireless condition acquisition unit 43 at step S11. At step S18, the distribution determination unit 53 determines whether the usage rate of the entire LTE channel $\rho_{LTE}$ is the threshold value $TH_{LTE}$ or more and the usage rate of the entire WLAN channel $\rho_{WLAN}$ is less than the threshold value $TH_{WLAN}$, or the $SNR_{LTE}$ is less than the lowest $TH_{S-LTE}$. When it is determined that $\rho_{LTE} \geq TH_{LTE}$ and $\rho_{WLAN} < TH_{WLAN}$, or the $SNR_{LTE}$ is less than the lowest $TH_{S-LTE}$, the distribution determination unit 53 sets a distribution ratio (LTE:WLAN=0:1), that is, sets a packet transfer with only by the WLAN channel at step S13, and transfers the distribution ratio to the transmitting unit 52 at step S14.

When the condition of step S18 is not satisfied, it is determined whether $\rho_{WLAN} \geq TH_{WLAN}$ and $\rho_{LTE} < TH_{LTE}$, or the $SNR_{WLAN}$ is less than the $TH_{S-WLAN}$ at step S19. Here, when it is determined that $\rho_{LTE} \geq TH_{LTE}$ and $\rho_{WLAN} < TH_{WLAN}$, or the $SNR_{WLAN}$ is less than the $TH_{S-WLAN}$, the distribution determination unit 53 sets a distribution ratio (LTE:WLAN=1:0), that is, sets a packet transfer with only by the LTE channel at step S16, and transfers the distribution ratio to the transmitting unit 52 at step S14.

Meanwhile, when the condition of step S19 is not satisfied, the distribution determination unit 53 sets a distribution ratio (LTE:WLAN=1−($\rho_{LTE}$−$\rho_{flow-LTE}$):1−($\rho_{WLAN}$−$\rho_{flow-WLAN}$)), at step S17, and transfers the distribution ratio to the transmitting unit 52 at step S14.

Received Packet Processing

Figure 10:
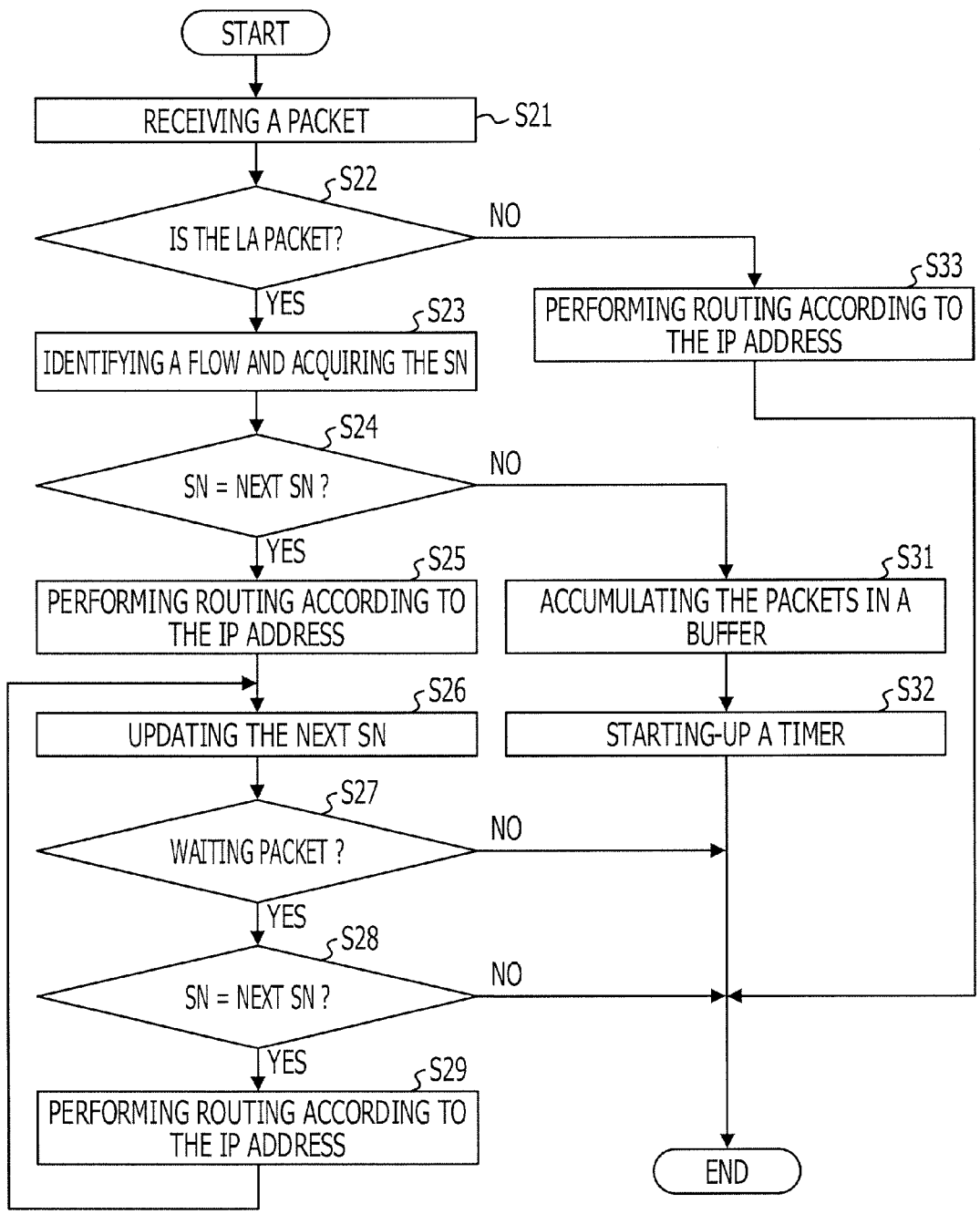
FIG. 10 is a flowchart illustrating an embodiment of a received packet processing.

FIG. 10 illustrates a flowchart of a first embodiment of a received packet processing performed by the received packet processing unit 54. In FIG. 10, the received packet processing unit 54 receives a packet from the receiving unit 51 at step S21. At step S22, the received packet processing unit 54 determines whether the received packet is a packet having been undergone the LA from the LA header or the tag in the device.

Figure 11:
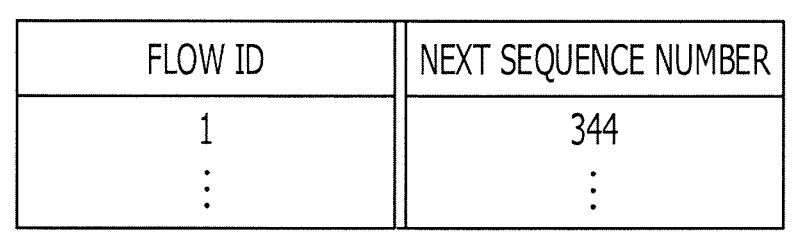

When it is determined that the received packet is a link aggregated packet, a flow ID and an SN are acquired from the LA header of the received packet at step S23. At step S24, the received packet processing unit 54 reads a next SN (Next SN) from a Next SN table illustrated in FIG. 11 using the acquired flow ID, and determines whether the SN from the LA header of the received packet coincides with the Next SN. As illustrated in FIG. 11, the Next SN table maintains the Next SN for each flow ID, and the Next SN table is maintained in the memory 46.

When it is determined that the SN is coincides with the Next SN at step S24, the received packet processing unit 54 performs a routing operation according to the destination IP address of the V-IP of the received packet at step S25. Also, at step S26, the received packet processing unit 54 updates the Next SN, which corresponds to the flow ID of the next SN table, by incrementing the Next SN by one.

At step S27, the received packet processing unit 54 determines whether a waiting packet is present or not. When the waiting packet is present, it is determined at step S28 whether the SN of the waiting packet coincides with a Next SN, which corresponds to a relevant flow ID. When the SN coincides with the Next SN at step S28, the received packet processing unit 54 performs a routing operation for the waiting packet according to the destination IP address of the V-IP of the waiting packet at step S29, and the operation procedure is progressed to step S26. When the waiting packet is absent at step S27 or the SN does not coincide with the Next SN at step S28, the process ends.

Meanwhile, when the SN does not coincide with the Next SN at step S24, the received packet processing unit 54 accumulates the received packet in a buffer within the memory 46 as a waiting packet at step S31. Subsequently, at step S32, the received packet processing unit 54 starts-up a timer, and the process ends.

Furthermore, when the received packet is not an LA packet at step S22, the received packet processing unit 54 performs a routing operation for the received packet according to the destination IP address (the destination IP address contained in a User IP packet) of the received packet at step S33, and the process ends.

Timer Interrupt Processing

Figure 12:
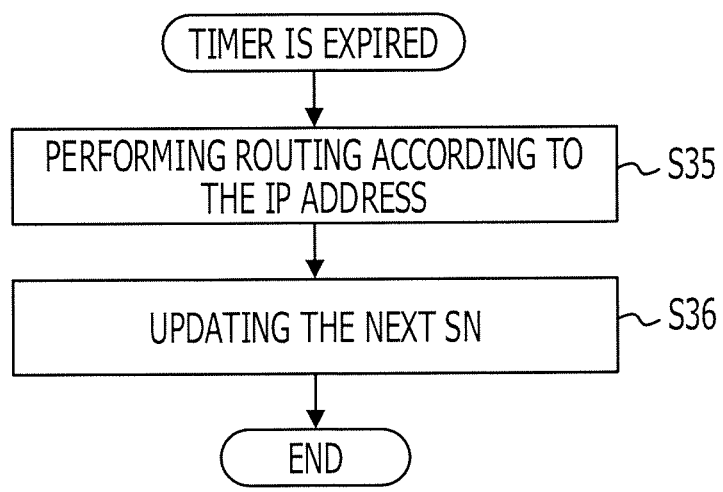
FIG. 12 is a flowchart illustrating a timer interrupt processing.

When the timer started at step S32 is expired (timed-out), a timer interrupt process illustrated in FIG. 12 is performed. In FIG. 12, the received packet processing unit 54 reads-out a waiting packet from the buffer, and performs a routing operation for the corresponding waiting packet according to the IP address thereof at step S35. The received packet processing unit 54 updates a Next SN corresponding to the flow ID of the waiting packet in the Next SN table, by incrementing the Next SN by one at step S36, and the interrupt processing ends.

Configuration of Wireless Terminal Apparatus

Figure 13:
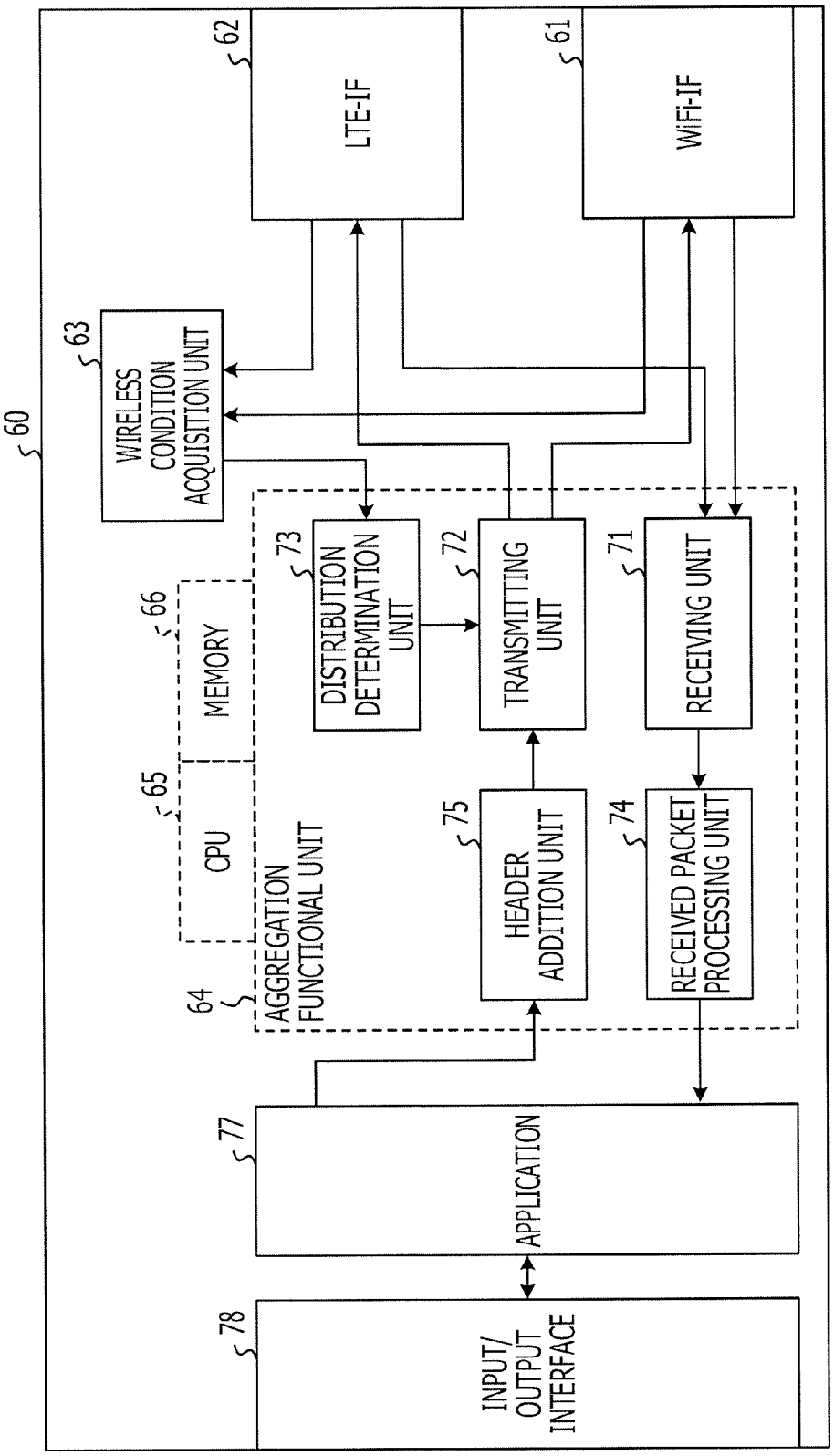
FIG. 13 is a block diagram illustrating a configuration of a first embodiment of a wireless terminal apparatus.

FIG. 13 illustrates a block diagram of a configuration of a first embodiment of a wireless terminal apparatus. In FIG. 13, a WiFi-IF 61 in a wireless terminal apparatus 60 is a WLAN interface, and is wirelessly coupled with a WLAN interface of a femtocell base station. An LTE-IF 62 is wirelessly coupled with an LTE interface of the femtocell base station. The WiFi-IF 61 and LTE-IF 62 notify a wireless condition acquisition unit 63 of the wireless channel conditions of the wireless LAN channel and the LTE channel, respectively. In addition, the WiFi-IF 61 and LTE-IF 62 supply packets received from another wireless terminal apparatus to a receiving unit 71 within an aggregation functional unit 64, and transmit the packets received from the transmitting unit 72 within an aggregation functional unit 64 to the femtocell base station via each of the WLAN channel and the LTE channel.

The wireless condition acquisition unit 63 collects the quality of the wireless channel and a congestion situation measured at each of the WiFi-IF 61 and LTE-IF 62, and notifies a distribution determination unit 73 within the aggregation functional unit 64 of the radio quality and the congestion situation.

The aggregation functional unit 64 is constituted with, for example, a CPU 65 and a memory 66, and the CPU 65 executes programs stored in the memory 66 to perform a process to be performed by each of the receiving unit 71, the transmitting unit 72, the distribution determination unit 73, a received packet processing unit 74, and a header addition unit 75.

The receiving unit 71 performs various operations, such as, for example, an error check for packets received from the wireless LAN channel and the LTE channel, and transfer the packet to the received packet processing unit 74. The received packet processing unit 74 re-arranges the sequence of the packets based on the SNs added to the packets received from the WLAN channel and the LTE channel, and transfers the packets to an application 77.

The application 77 is coupled to, for example, a display unit, a touch panel unit, and a telephone function unit via an input/output interface 78, and performs various processes for the respective received packets and supplies the received packets to, for example, the display unit, the touch panel unit, and the telephone function unit. Further, the application 77 performs various processes corresponding to the input from, for example, the display unit, the touch panel unit, and the telephone function unit to generate a transmission packet, and supplies the packets to the header addition unit 75.

The header addition unit 75 determines whether the packets received from the application 77 use either any one of or both of the LTE channel and the wireless LAN channel, and associates information of the determination result to the packets as a tag in the device. In addition, when the LTE channel and the wireless LAN are utilized for the packets simultaneously, the header addition unit 75 adds an LA header including a SN and an IP address which is common to a packet flow utilized simultaneously to the packets, and transmits the LA header added packets to the transmitting unit 72. The operations of the flow identification process performed by the header addition unit 55 are the same as those performed by the header addition unit 75 within the femtocell base station apparatus 40.

The transmitting unit 72 refers to the tag in the device delivered from the header addition unit 75 and determines whether the associated packets use either any one of or both of the LTE channel and the wireless LAN channel. When it is determined that the associated packets use any one of the LTE channel and the wireless LAN channel, the transmitting unit 72 transfers the packets to a wireless channel interface indicated (represented) by the tag in the device. Meanwhile, when both of the LTE channel and the wireless LAN channel are used simultaneously, the transmitting unit 72 determines a wireless channel interface for use in transferring the corresponding packets based on information delivered from a distribution determination unit 73, and transfers the packet to the determined wireless channel interface. In this case, the distribution determination unit 73 selects a wireless channel for use in a packet transfer for each packet based on information delivered from the wireless condition acquisition unit 63, and notifies the transmitting unit 72 of the selected wireless channel. The operations of the distribution determination process performed by the distribution determination unit 73 are the same as those performed by the distribution determination unit 53 within the femtocell base station apparatus 40.

Received Packet Processing by Wireless Terminal Apparatus

Figure 14:
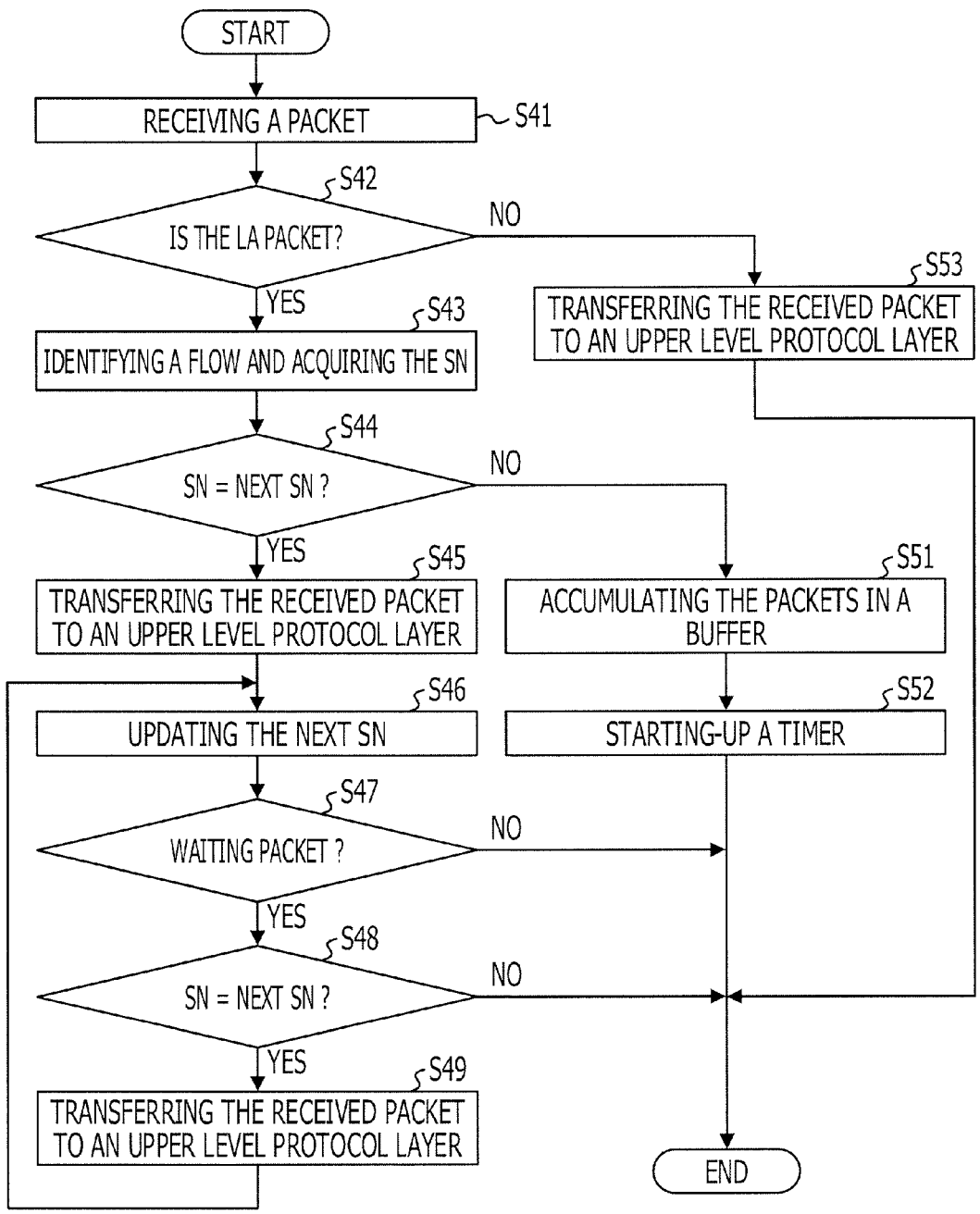
FIG. 14 is a flowchart illustrating an embodiment of a received packet processing.

FIG. 14 is a flowchart illustrating a first embodiment of a received packet processing performed by the received packet processing unit 74. In FIG. 14, the received packet processing unit 74 receives a packet from the receiving unit 51 at step S41. At step S42, the received packet processing unit 74 determines whether the received packet is an LA packet or not, from the LA header or the tag in the device.

When it is determined that the received packet is an LA packet, a flow ID and an SN are acquired from the LA header of the received packet at step S43. At step S44, the received packet processing unit 74 reads a Next SN from a next SN table illustrated in FIG. 11 using the acquired flow ID, and determines whether a SN from the LA header of the received packet coincides with the Next SN. As illustrated in FIG. 11, the next SN table maintains the Next SN for each flow ID, and the Next SN table is maintained in the memory 46.

When it is determined that the SN coincides with the Next SN at step S44, the received packet processing unit 74 transfers the received packet to the application 77, which is an upper level protocol layer, at step S45. Also, the received packet processing unit 74 updates the Next SN corresponding to the flow ID of the next SN table by incrementing the Next SN by one at step S46.

At S47, the received packet processing unit 74 determines whether a waiting packet is present or not. When it is determined that the waiting packet is present, it is determined at step S48 whether a SN of the waiting packet coincides with the Next SN number which corresponds to a corresponding flow ID. When the SN coincides with the Next SN at step S48, the received packet processing unit 74 transfers the waiting packet to the application 77 at step S49. When the waiting packet is absent at step S47 or the SN does not coincide with the Next SN at step S48, the process ends.

Meanwhile, When it is determined that the SN does not coincide with the Next SN at step S44, the received packet processing unit 74 accumulates the received packet in a buffer within the memory 46 as a waiting packet at step S51. Subsequently, the received packet processing unit 74 starts-up a timer at step S52, and the process ends.

Furthermore, when it is determined that the received packet is not an LA packet at step S42, the received packet processing unit 74 transfers the received packet to the application 77 at step S53, and the process ends. Further, the interrupt processing for the timer started up step S52 is the same as that in FIG. 12.

Flow of Packet

Figure 15:
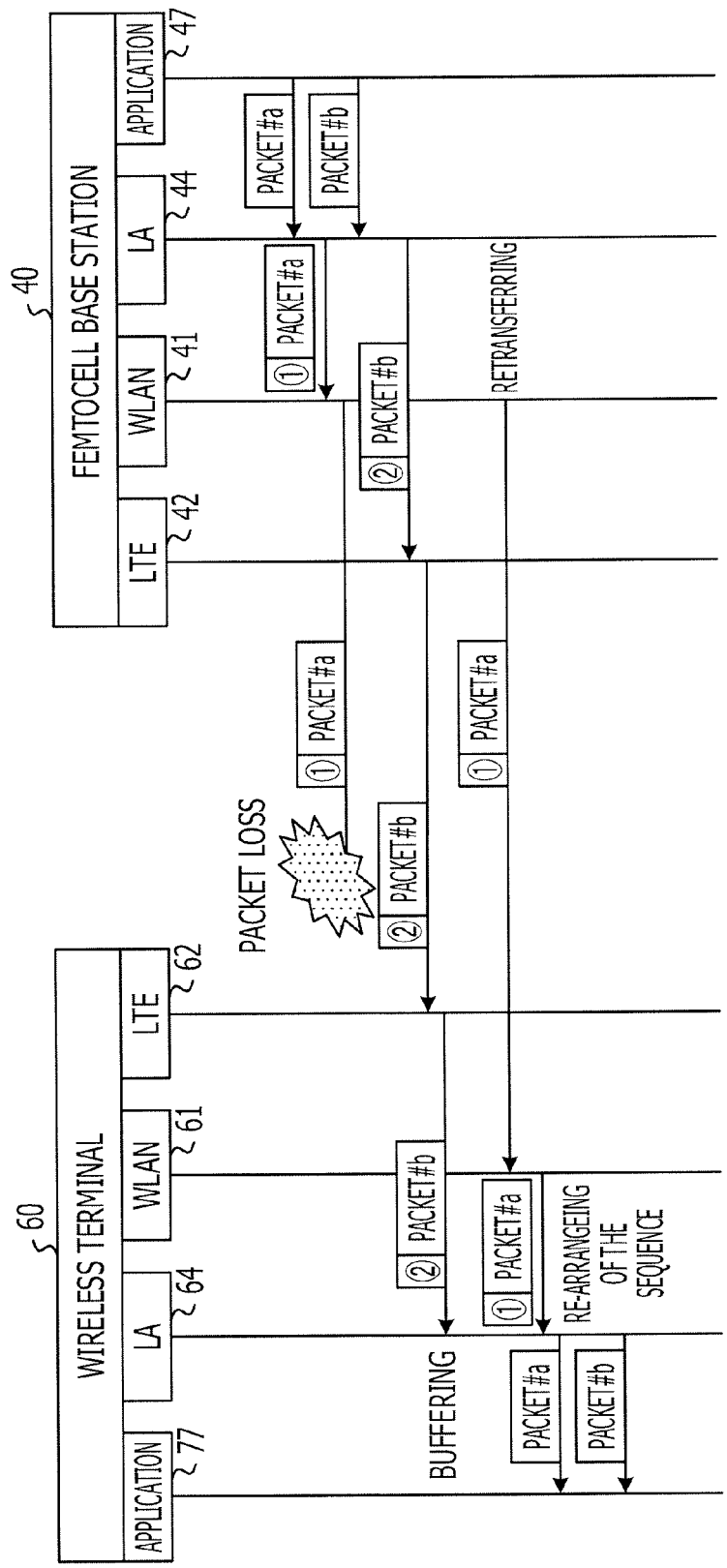
FIG. 15 is a view illustrating the flow of packets between a femtocell base station apparatus and a wireless terminal apparatus.

FIG. 15 illustrates an embodiment of a packet flow between the femtocell base station apparatus 40 and the wireless terminal apparatus 60. The numbers enclosed within the circles appended to each packet illustrated in FIG. 15 denotes a SN of an LA header.

In FIG. 15, packets #a, #b output from the network interface 47 of the femtocell base station apparatus 40 are supplied to the aggregation functional unit 44. The packet #a is transmitted to the wireless terminal apparatus 60 from the WiFi-IF 41 over a wireless LAN channel, and the packet #b is transmitted to the wireless terminal apparatus 60 from the LTE-IF 42 over an LTE channel.

The packet #a is not received by the WiFi-IF 61 of the wireless terminal apparatus 60, and the packet #b is received by the LTE-IF 62 of the wireless terminal apparatus 60. The packet #a not received by the WiFi-IF 61 is re-transmitted from the WiFi-IF 41 to the wireless terminal apparatus 60 over the wireless LAN channel, and received by the WiFi-IF 61 of the wireless terminal apparatus 60. The received packet processing unit 74 of the wireless terminal apparatus 60 re-arranges the sequence of the packets based on the SN appended to the received packets, and transmits the packets to the application 77.

According to the embodiment, it is possible to perform a packet distribution corresponding to the conditions of each of the LTE channel and the wireless LAN channel, that is, the congestion level or the quality of wireless channel. Further, it is possible to provide an aggregation function to both of the traffic for a mobile operator network and the traffic within a home network.

Configuration of Network

Figure 16:
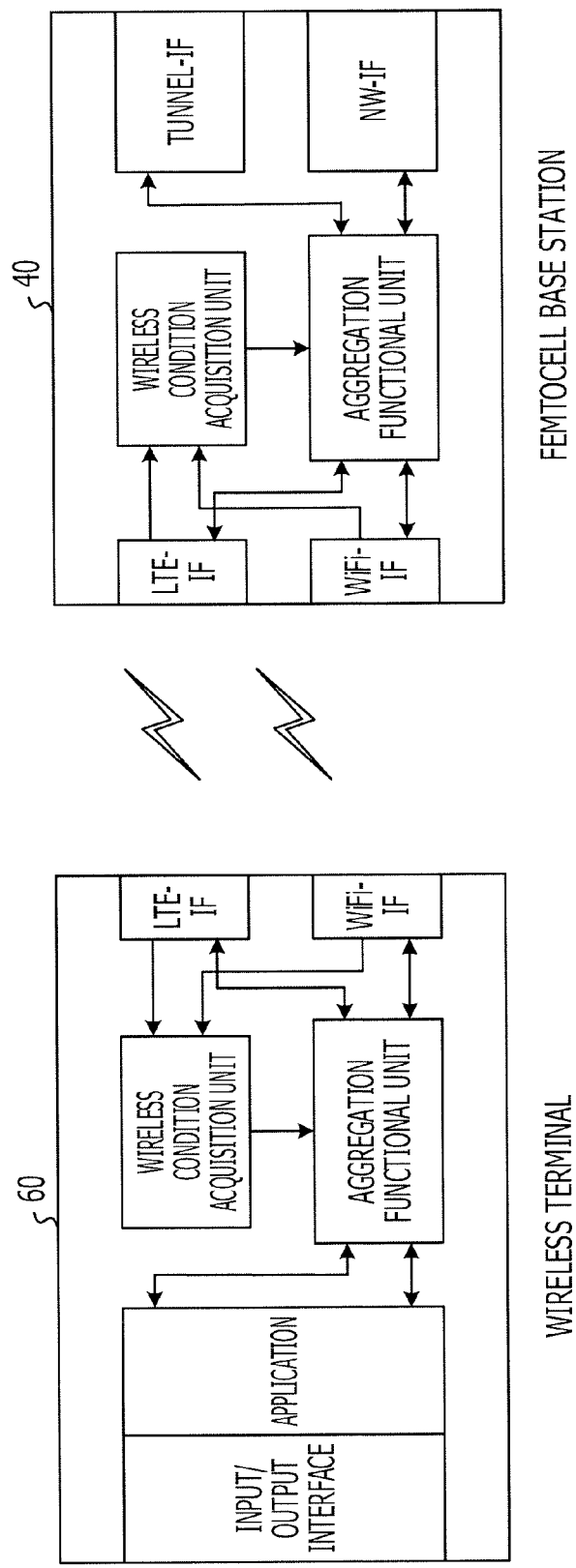
FIG. 16 is a view illustrating an embodiment in which a femtocell base station apparatus and a wireless terminal apparatus are directly coupled with each other using both links of the LTE and the wireless LAN.
Figure 17:
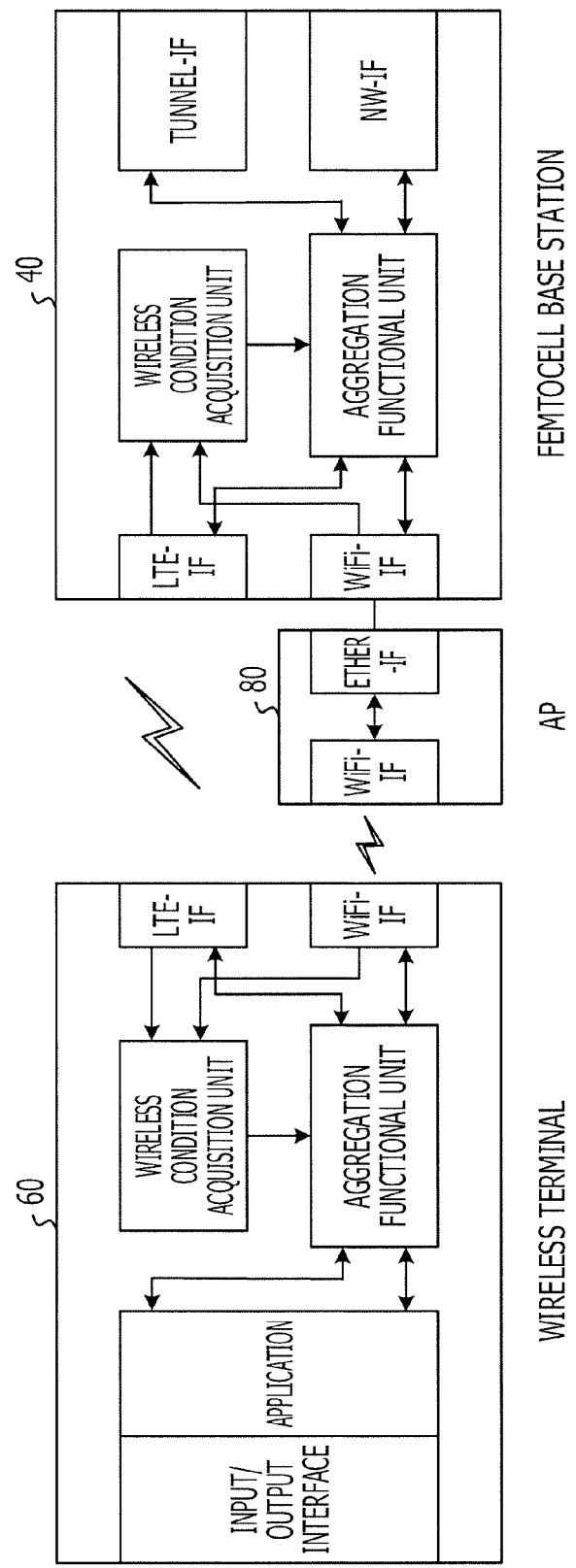
FIG. 17 is a view illustrating an embodiment in which a femtocell base station apparatus and a wireless terminal apparatus are coupled with each other via a wireless LAN access point.

FIG. 16 illustrates an embodiment in which the femtocell base station apparatus 40 and the wireless terminal apparatus 60 are directly coupled using both of the LTE link and the wireless LAN link. In the meantime, en embodiment may also be considered in which the femtocell base station apparatus 40 and the wireless terminal apparatus 60 are coupled via an access point (AP) of the wireless LAN other than a femtocell base station. FIG. 17 illustrates an embodiment in which the femtocell base station apparatus 40 and the wireless terminal apparatus 60 are coupled with each other via a wireless LAN AP 80.

In FIG. 17, the wireless LAN AP 80 and the wireless terminal apparatus 60 are coupled with each other via a LAN channel such as the Ethernet (registered trademark). In FIG. 17, the wireless condition acquisition unit 63 of the femtocell base station apparatus 40 acquires the wireless channel condition of the wireless LAN AP 80 using, for example, a Simple Network Management Protocol (SNMP).

Second Embodiment

The first embodiment has a configuration in which the packets constituting a packet flow are distributed by a femtocell base station apparatus. However, there is a method in which the packets are distributed from a communication node at an upstream side of the network, and it is necessary to make the method to co-exist with the packet distribution by the femtocell base station apparatus.

Figure 18:
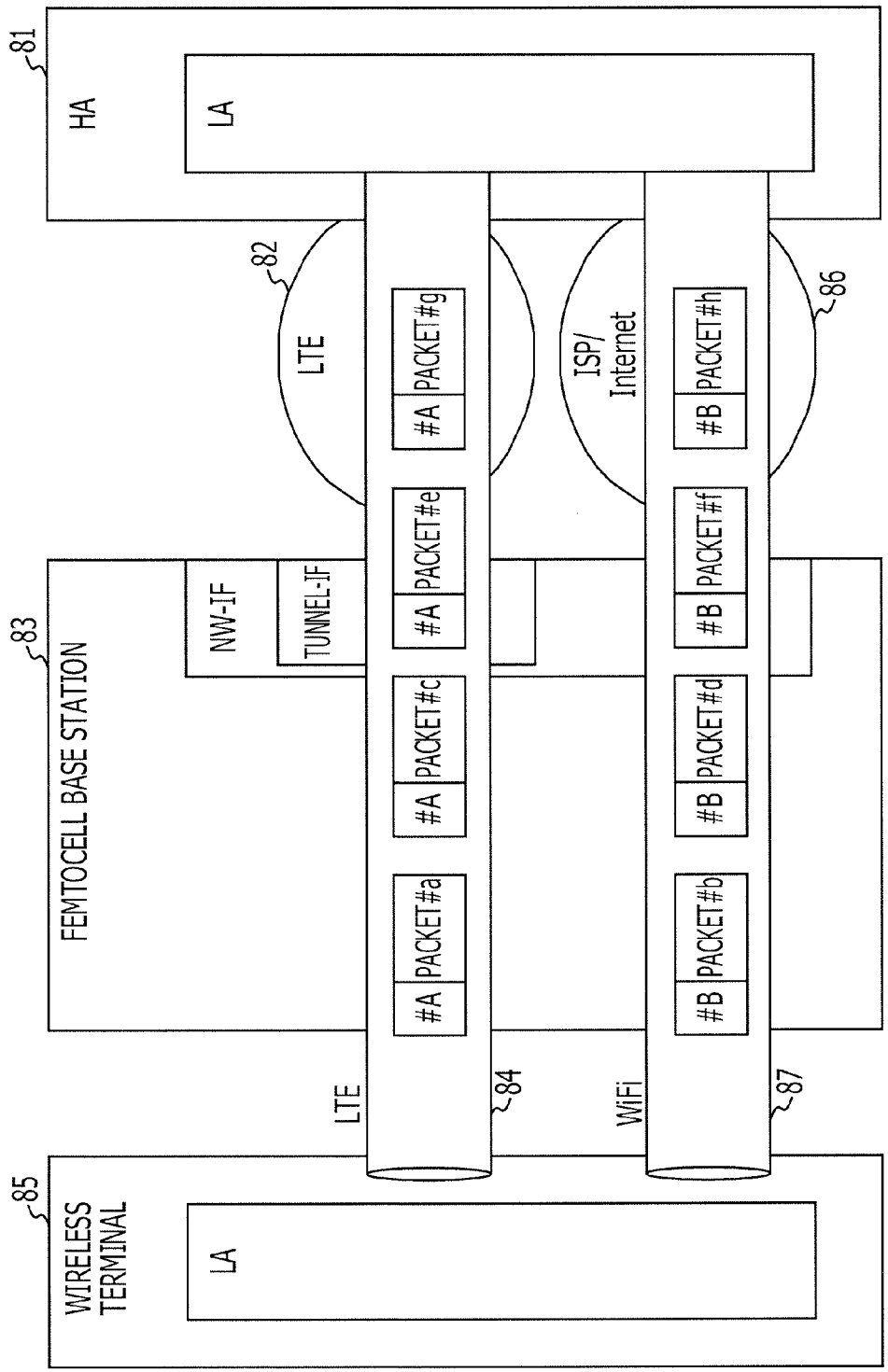
FIG. 18 is a view illustrating a packet transfer method using a link aggregation which distributes packets to an LTE channel and a WLAN channel.

FIG. 18 illustrates an example of a packet transfer method using an LA which distributes packets to an LTE channel and a WLAN channel at an upstream side of the network. In FIG. 18, the packet indicates a packet which contains a home address of the wireless terminal apparatus in its header. Though the destination wireless terminal apparatuses to which the packets are destined are the same, an IP address unique to each wireless access link is appended to the encapsulation header added to the packet. The packet with the encapsulation header #A is transferred to a femtocell base station apparatus 83 from a HA 81 via an LTE network 82, and further transferred to a wireless terminal apparatus 85 via an LTE channel 84. Further, the packet with the encapsulation header #B is transferred to a femtocell base station apparatus 83 from the HA 81 via an IP network 86, and further transferred to a wireless terminal apparatus 85 via a WLAN (Wi-Fi) line 87.

Figure 19:
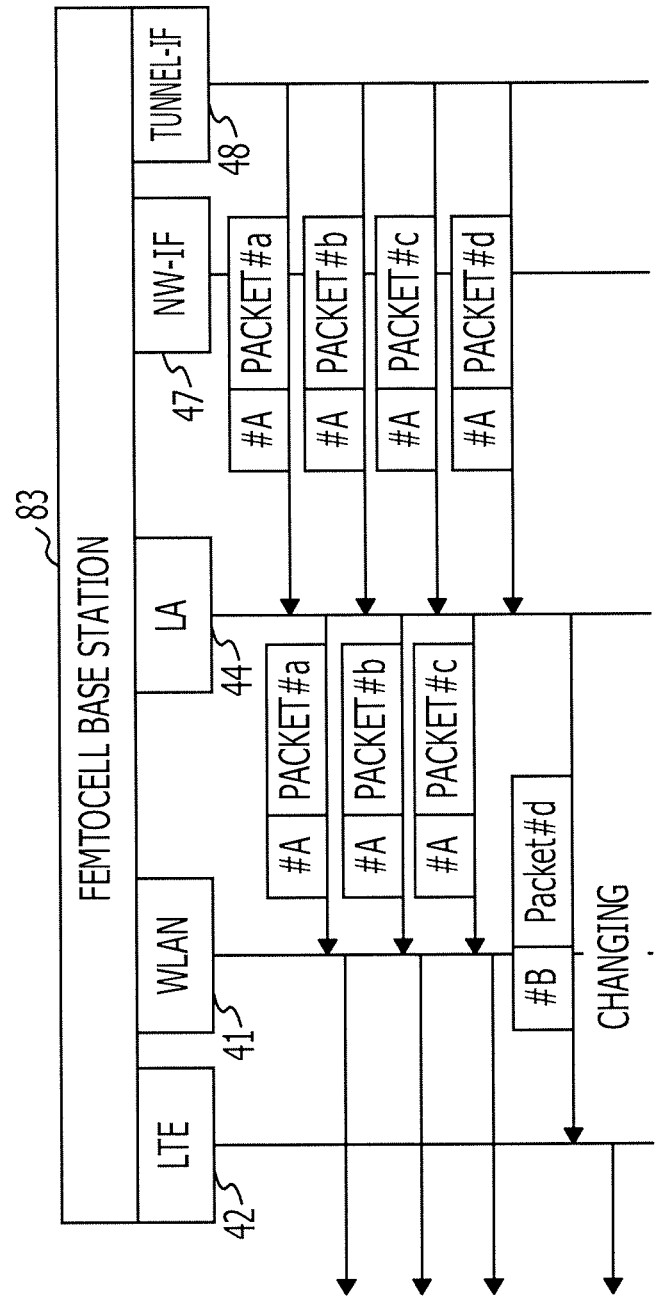
FIG. 19 is a view illustrating an operation example in which packets received from an LTE network are redistributed to a WLAN interface.

FIG. 19 illustrates an operation example in which the packets received from the LTE network are re-distributed to a WLAN interface by the femtocell base station apparatus 83. In FIG. 19, the femtocell base station apparatus 83 receives packets #a, #b, #c, #d from the LTE network 82. Since the packets #a, #b, #c, #d are transferred over the LTE network 82, the encapsulation header #A is added thereto.

The link aggregation functional unit 44 of the femtocell base station apparatus 83 is transferring the packets #a, #b, #c to the LTE-IF 42, and re-transmitting only the packet #d to the WLAN-IF 41. Accordingly, although the LTE channel 84 is in a congestion state, a high throughput is realized by utilizing the WLAN channel while rapidly reducing the load in the LTE channel 84.

Second Embodiment: Configuration of Femtocell Base Station Apparatus

Figure 20:
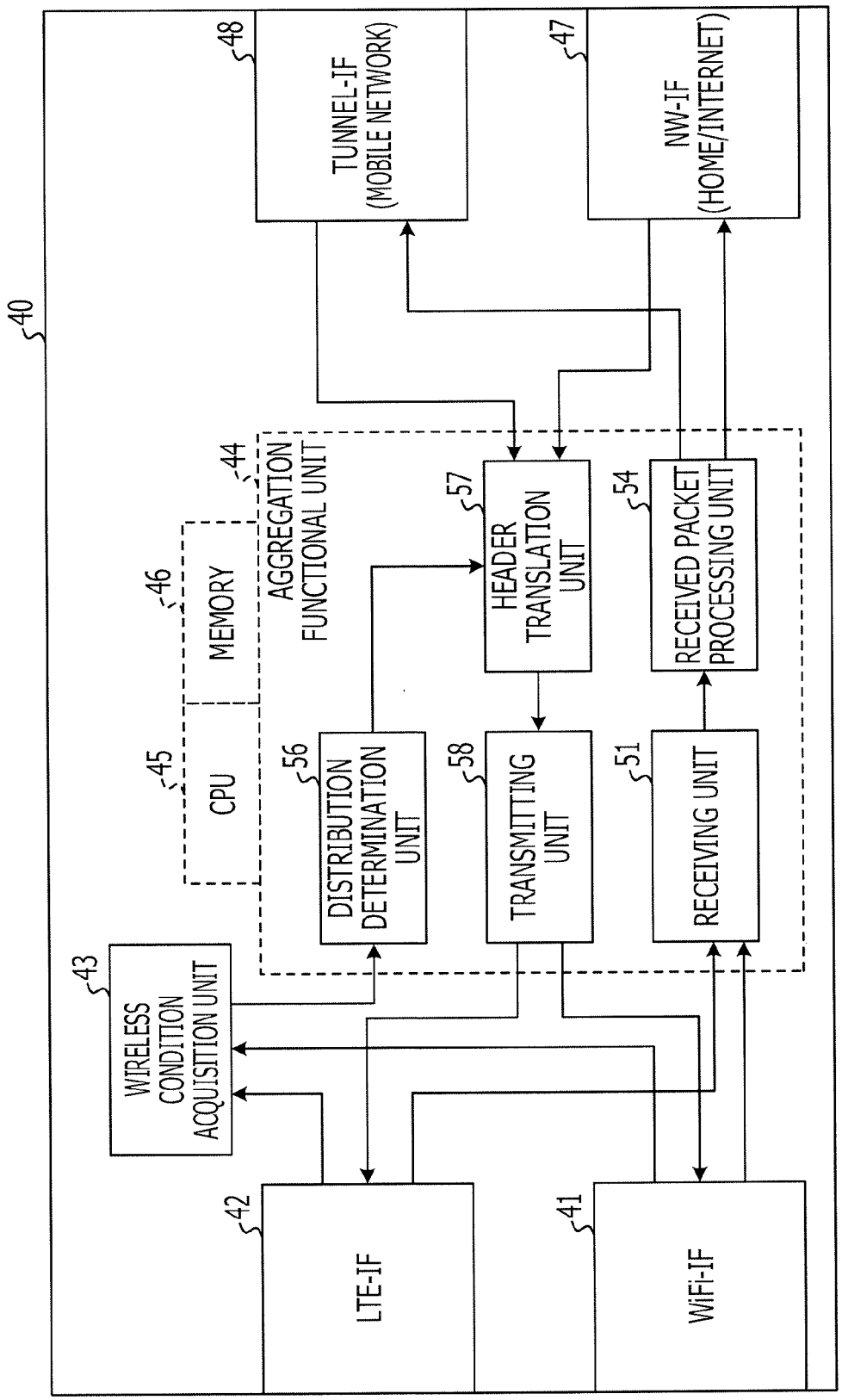
FIG. 20 is a block diagram illustrating the configuration of a second embodiment of the femtocell base station apparatus.

FIG. 20 illustrates a block diagram of the configuration of a second embodiment of the femtocell base station apparatus. In FIG. 20, the WiFi-IF 41 in the femtocell base station apparatus 40 is a wireless LAN (WLAN) interface, and is wirelessly coupled with the WLAN interface of a wireless terminal apparatus. The LTE-IF 42 is wirelessly coupled with an LTE interface of the wireless terminal apparatus. The WiFi-IF 41 and the LTE-IF 42 notify the wireless condition acquisition unit 43 of the wireless channel condition of the wireless LAN channel and the LTE channel, respectively. In addition, the WiFi-IF 41 and the LTE-IF 42 supply packets received from the wireless terminal apparatus to the receiving unit 51 within the aggregation functional unit 44, and transmit packets received from the transmitting unit 52 within the aggregation functional unit 44 to the wireless terminal apparatus via each of the wireless LAN channel and the LTE channel.

The wireless condition acquisition unit 43 collects the quality and the congestion situation of the wireless channel measured at each of the WiFi-IF 41 and LTE-IF 42, and notifies the distribution determination unit 56 within the aggregation functional unit 44 of the quality of and the congestion situation of the wireless channel.

The aggregation functional unit 44 is constituted with, for example, the CPU 45 and the memory 46, and the CPU 45 executes programs stored in the memory 46 to perform processing to be performed by each of the receiving unit 51, the transmitting unit 58, a distribution determination unit 56, the received packet processing unit 54, and a header translation unit 57.

The receiving unit 51 performs various operations, such as, for example, an error check for packets received from the wireless LAN channel and the LTE channel, and transfers the packets to the received packet processing unit 54. The received packet processing unit 54 re-arranges the sequence of the packets based on the SN added to the packets received from the wireless LAN channel and the LTE channel. Also, the received packet processing unit distributes the packets to the NW-IF 47 for, for example, a home network, and the tunnel-IF 48 for a mobile operator network based on the destination address within the packet header.

Each of the network interface 47 and the tunnel interface 48 transfers the packets delivered from the received packet processing unit 54 to an upper level communication node. In addition, each of the network interface 47 and the tunnel interface 48 transfers the packets received from the upper level communication node to the header translation addition unit 57.

Here, when the packets received from the tunnel interface 48 is being distributed from a HA which is at an upstream side of the network, an encapsulation header has been added to the corresponding packet. The format of the encapsulation header has the same structure as the LA header illustrated in FIG. 5. However, the contents of the source IP address contained in the V-IP of the encapsulation header is different from that of the LA header. That is, for the downlink (DL), the source IP address contained in the V-IP becomes an IP address of the HA. The destination IP address contained in the V-IP becomes an IP address of the LTE or the Wi-Fi, and an IP address unique to the LTE is set for the packets received over the LTE channel and an IP address unique to the WLAN is set for the packets received over the WLAN channel.

In contrast, in a case of the LA header, when the packet flows coincide with each other, the source IP address and the destination IP address of the V-IP for the packets to be transmitted to LTE and WLAN are the same.

The distribution determination unit 56 calculates a distribution ratio (LTE:WLAN) based on the conditions of the wireless LAN channel and the LTE channel from the wireless condition acquisition unit 43, and supplies the distribution ratio to the header translation unit 57.

The header translation unit 57 receives the packets that belongs to the same packet flow from the two interfaces, that is, the network interface 47 and the tunnel interface 48, and detects that the relevant packet flow is in a link aggregation state by an upper level network. An IP address or a port number is used to identify a packet flow. Also, the header translation unit 57 changes the destination, that is, the destination IP address in the encapsulation header, and transmits the destination IP address to the transmitting unit 58 as needed so that the distribution ratio of the packets of the packet flow in a link aggregation approaches the distribution ratio instructed from the distribution determination unit 56.

The transmitting unit 58 transfers the packet to the WiFi-IF 41 or the LTE-IF 42 based on the destination IP address of the encapsulation header of the packet supplied from the header translation unit 57.

Second Embodiment of Flow Identification Process

Figure 21:
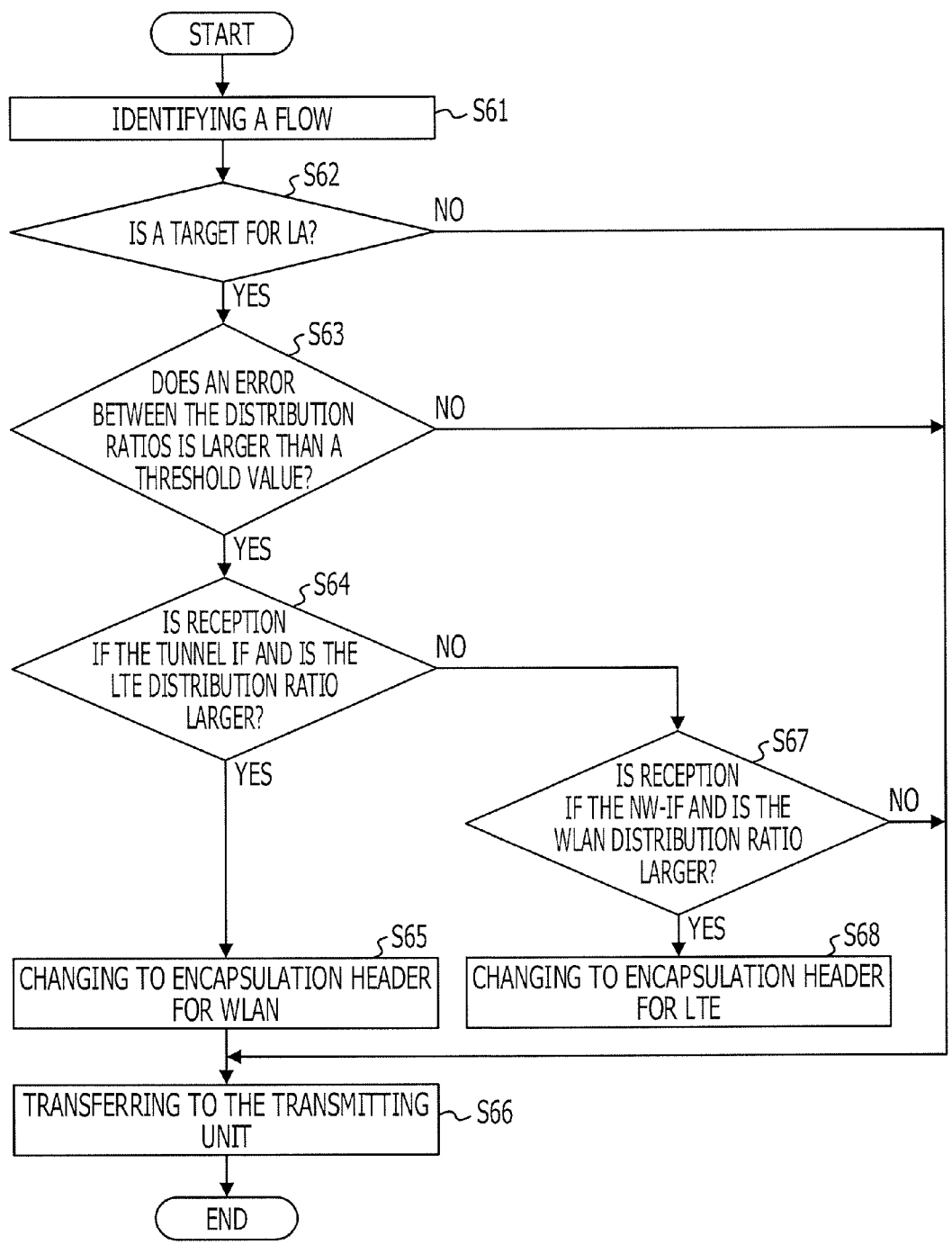
FIG. 21 is a flowchart illustrating a second embodiment of the flow identification process.

FIG. 21 is a flowchart illustrating a second embodiment of a flow identification process performed by the header translation unit 57. The process begins when the received packets are supplied. In FIG. 21, the header translation unit 57, at step S61, retrieves the flow table illustrated in FIG. 22 using a destination IP address and a port number included in the IP header of the received packet to obtain a flow ID and a Tx mode used for identifying a packet flow.

In FIG. 22, the flow ID is used for identifying the packet flow. The Tx mode is used for determining whether an LA is to be performed, whether only the LTE channel is to be used or whether only the wireless LAN channel is to be used. In the encapsulation header, the destination IP address #A is set for a case where the LTE channel is determined to be used and the destination IP address #B is set for a case where the wireless LAN channel is determined to be used. The flow table is maintained in the memory 46. Further, when the first packet of a packet flow having the destination IP address same as the port number is supplied, a flow ID and a Tx mode are determined from the destination IP address and the port number, and each of the entries is set in the flow table. For example, an LA is set to be performed for a packet flow having a destination IP address and a port number that uses a FTP or a HTTP.

At step S62, the header translation unit 57 determines whether the Tx mode of the packet flow of the received packet is the LA, and determines whether the packets of the same flow are distributed to both of the LTE channel and the WLAN channel by an upper level network apparatus such as, for example, the HA. Also, when the packets are being distributed to both of the LTE channel and the WLAN channel, it is recognized as an LA flow by the header translation unit 57.

When it is recognized that the packet flow is the LA flow, the header translation unit 57, at step S63, obtains a distribution ratio (referred to as a received distribution ratio) which is distributed to both of the LTE channel and the WLAN channel by the upper level network apparatus, and received by the network interface 47 and the tunnel interface 48, obtains an error between the received distribution ratio and the distributed distribution ratio from the distribution determination unit 56, and determines whether the error exceeds a predetermined threshold value. Further, the predetermined threshold value amounts to a value of about 10% to 20% of a distributed distribution ratio from the distribution determination unit 56.

When the error exceeds the predetermined threshold value, the header translation unit 57, at step S64, determines whether a condition that the corresponding packet is a packet received from the tunnel interface 48 and an LTE ratio in the received distribution ratio is larger than an LTE ratio in the distributed distribution ratio, is satisfied. When it is determined that the condition from the distribution determination unit 56 is satisfied, the header translation unit 57, at step S65, changes the destination IP address of the encapsulation header of the received packet such that the received packet passes through the WLAN channel, and transfers the received packet to the transmission unit 58 at step S66.

Meanwhile, when it is determined that the condition defined at step S64 is not satisfied, the header translation unit 57, at step S67, determines whether a condition that the corresponding packet is a packet received from the network interface 47 and the WLAN ratio in the received distribution ratio is larger than the WLAN ratio in the distributed distribution ratio from the distribution determination unit 56, is satisfied. When it is determined that the condition is satisfied, the header translation unit 57 changes the destination IP address of the encapsulation header of the received packet at step S68 such that the received packet passes through the LTE channel, and transfers the received packet to the transmission unit 58 at step S66. In a case where the condition defined at step S67 is not satisfied, or the error does not exceed the predetermined threshold value at step S63, or the Tx mode of the flow of the received packet is not the LA at step S62, the header translation unit 57 does not change the destination IP address of the encapsulation header of the corresponding received packet, and transfers the packet to the transmission unit 58 at step S66.

According to the present embodiment, when, for example, the wireless LAN is in a congestion situation or the quality thereof is degraded, it is possible to avoid the occurrence of a situation in which the communication rate via the wireless LAN channel decreases while there is a room for the traffic in the LTE channel side and thus, it becomes possible to re-distribute the traffic distributed from an upstream side of the network in consideration of the wireless signal quality or resources.

In the second embodiment, the wireless terminal apparatus receives the packets that are distributed to each path which passes through the LTE network and the WLAN network in an upper level network equipment, and that have been passed through each of the LTE network and the WLAN network. In this case, the end-to-end delay of each network may be significantly different from each other. In such a case, a buffer waiting time for arranging the packet sequence increases. For this reason, there is a possibility of performance degradation such as an occurrence of a sequence mismatch due to the expiration of a sequence arrangement timer or packet loss due to an overflow of the sequence arrangement buffer.

Accordingly, in a third embodiment, the header translation unit 57 performs a distribution process in such a manner that a predetermined delay is added to a packet received from a path having a small delay in order to reduce the delay difference between paths that pass through the LTE network and the WLAN network.

Third Embodiment of Flow Identification Process

Figure 23:
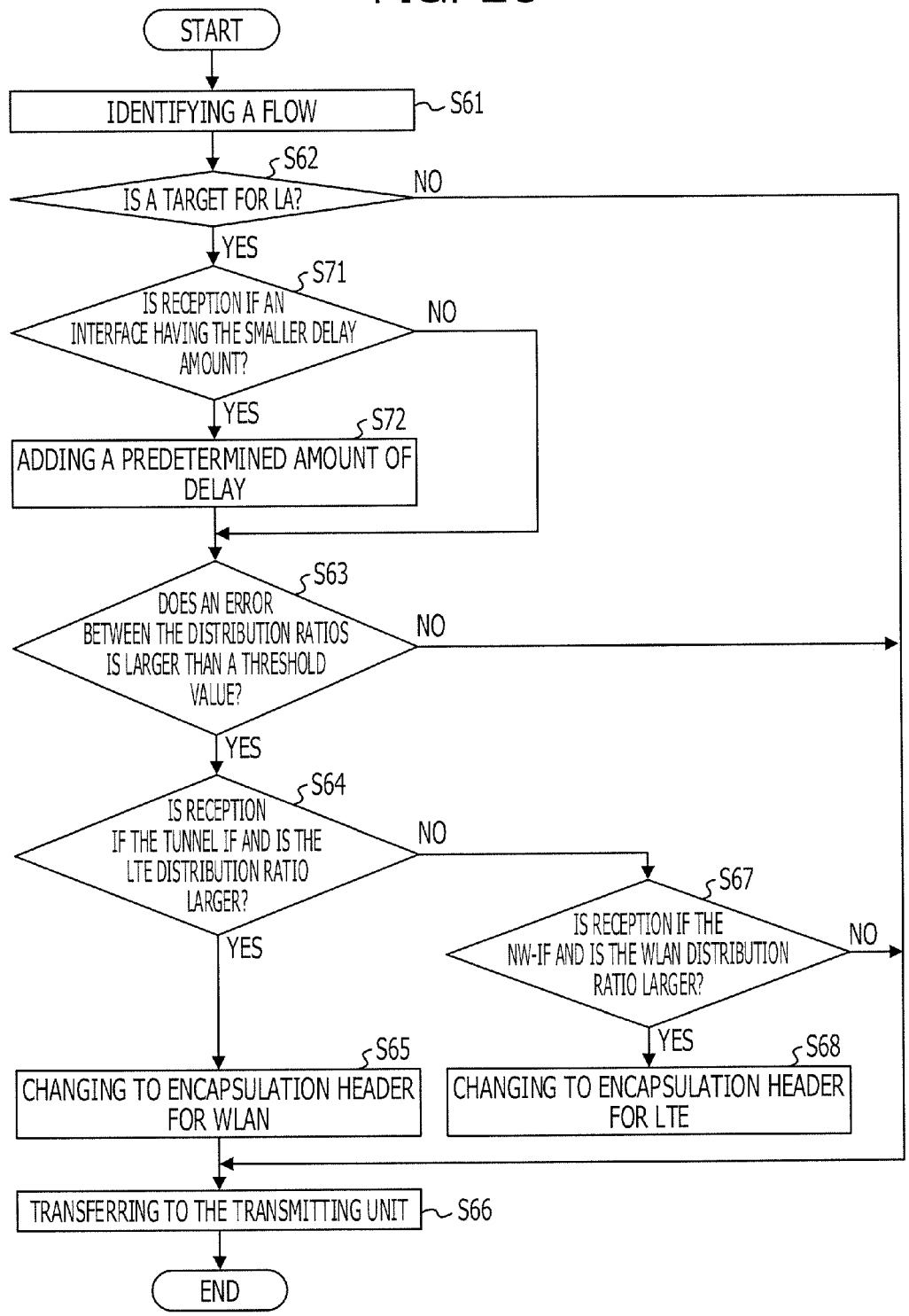
FIG. 23 is a flowchart illustrating a third embodiment of the flow identification process.

FIG. 23 is a flowchart illustrating a second embodiment of a flow identification process performed by the header translation unit 57. The process begins when the received packets are supplied. The same components of FIG. 23 as those of FIG. 21 are denoted by the same reference numerals. In FIG. 23, the header translation unit 57, at step S61, retrieves a flow table as illustrated in FIG. 22 using a destination IP address and a port number included in the IP header of the received packet to obtain a flow ID and a Tx mode used for identifying a packet flow. In FIG. 22, the flow ID is used for identifying the packet flow. The Tx mode is used for determining whether an LA is to be performed, whether only the LTE channel is to be used, or whether only the wireless LAN channel is to be used. In the encapsulation header, the destination IP address #A is set for a case where the LTE channel is determined to be used and the destination IP address #B is set for a case where the wireless LAN channel is determined to be used. The flow table is maintained in the memory 46. Further, when the first packet of a packet flow having the destination IP address same as the port number is supplied, a flow ID and a Tx mode are determined from the destination IP address and the port number, and each of the entries is set in the flow table. For example, an LA is set to be performed for a packet flow having a destination IP address and a port number that uses a FTP or HTTP.

At step S62, the header translation unit 57 determines whether the Tx mode of the packet flow of the received packet is the LA, and determines whether the packets of the same flow are distributed to both of the LTE channel and the WLAN channel by an upper level network apparatus such as, for example, the HA. Also, when the packets are being distributed to both of the LTE channel and the WLAN channel, it is recognized as an LA flow by the header translation unit 57.

When it is recognized that the packet flow is the LA flow, the header translation unit 57, at step S71, determines whether the network interface 47 or the tunnel interface 48 which has received the packet corresponds to an interface having a smaller delay amount. When it is determined that the interface has the smaller delay amount, the header translation unit 57 adds a predetermined amount of delay at step S72, and the process proceeds to step S63. When it is determined that the interface has a larger delay amount, the process proceeds to step S63 without adding the predetermined amount of delay. Further, it may be considered that an additional amount of delay may be set to the minimum value of the differences in the received timings of the packets received from the different interfaces 47 or 48 having continuous SNs (see, e.g., FIG. 24), or the delay may be measured by using, for example, a ping packet.

When it is recognized that the packet flow is the LA flow, the header translation unit 57, at step S63, obtains a distribution ratio (referred to as a received distribution ratio) which is distributed to both of the LTE channel and the WLAN channel by the upper level network apparatus, and received by the network interface 47 and the tunnel interface 48, obtains an error between the received distribution ratio and the distributed distribution ratio from the distribution determination unit 56, and determines whether the error exceeds a predetermined threshold value. Further, the predetermined threshold value amounts to a value of about 10% to 20% of a distributed distribution ratio from the distribution determination unit 56.

When the error exceeds the predetermined threshold value, the header translation unit 57, at step S64, determines whether a condition that the corresponding packet is a packet received from the tunnel interface 48 and an LTE ratio in the received distribution ratio is larger than an LTE ratio in the distributed distribution ratio, is satisfied. When it is determined that the condition from the distribution determination unit 56 is satisfied, the header translation unit 57 changes the destination IP address of the encapsulation header of the received packet at step S65 such that the received packet passes through the WLAN channel, and transfers the received packet to the transmission unit 58 at step S66.

Meanwhile, when it is determined that the condition defined at step S64 is not satisfied, the header translation unit 57, at step S67, determines whether a condition that the corresponding packet is a packet received from the network interface 47 and the WLAN ratio in the received distribution ratio is larger than the WLAN ratio in the distributed distribution ratio from the distribution determination unit 56 is satisfied. When it is determined that the condition is satisfied, the header translation unit 57 changes the destination IP address of the encapsulation header of the received packet at step S68 such that the received packet passes through the LTE channel, and transfers the received packet to the transmission unit 58 at step S66. In a case where the condition defined at step S67 is not satisfied, or the error does not exceed the predetermined threshold value at step S63, or the Tx mode of the flow of the received packet is not the LA at step S62, the header translation unit 57 does not change the destination IP address of the encapsulation header of the corresponding received packet, and transfers the packet to the transmission unit 58 at step S66.

By doing this, it is possible to reduce the delay difference between paths that pass through the LTE network and the WLAN network.

Delay Difference Calculation Process

Figure 24:
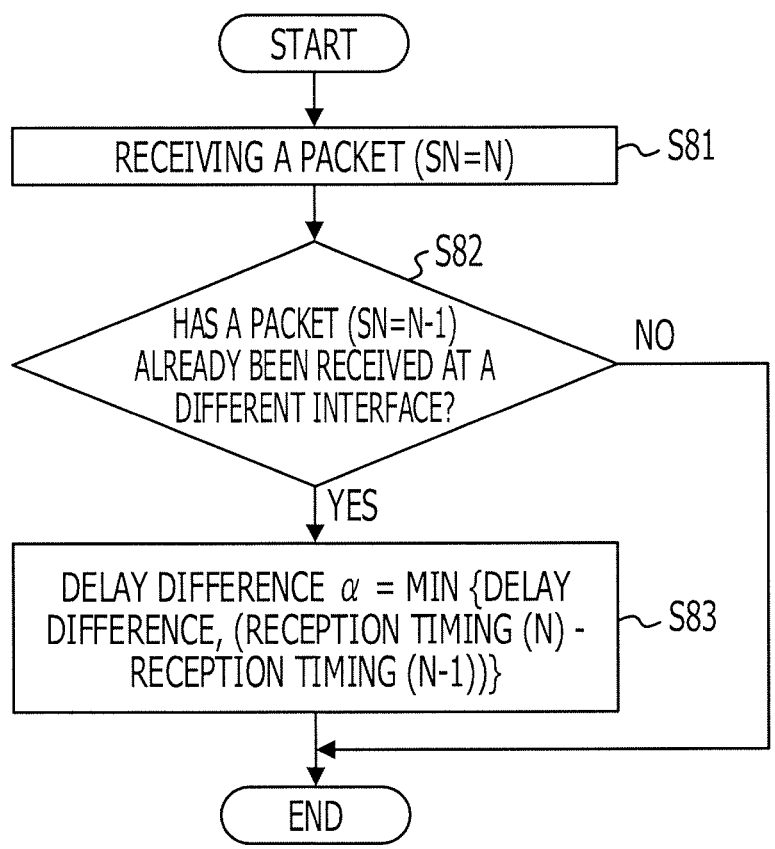
FIG. 24 is a flowchart illustrating the calculation process of a delay difference.

FIG. 24 is a flowchart illustrating a delay difference calculation process performed at step S71. In FIG. 24, the header translation unit 57 obtains a SN (=n) of a packet received from the network interface 47 or the tunnel interface 48 at step S81. At step S82, the header translation unit 57 determines whether a packet having a SN (=n−1) has been already received at an interface 48 or 47 different from another interface 47 or 48 which has obtained the packet having the SN (=n).

When it is determined that the packet having an SN (=n−1) has been already received at step S82, the minimum delay difference [delay difference=min {delay difference, (reception timing of packet having the SN (=n)−reception timing of packet having the SN (=n−1))}] including the result calculated previously is obtained at step S83, and the process ends. When it is it is determined that the packet having the SN (=n−1) has not been received and the packet having the SN (=n−1) is received at the same interface from which the packet having the SN (=n) is received at step S82, the process ends. Also, the delay difference calculated in the present process is used as an additional delay amount at step S72 in FIG. 23.

According to the present embodiment, when the sequence of the packets arrived from the LTE channel and the wireless LAN channel is arranged in the wireless terminal apparatus, it is possible to reduce the difference in delay between the LTE channel and the wireless LAN channel, and the delay in an arrangement sequence becomes smaller making it possible to avoid the degradation of communication quality.

According to the present embodiment, it is possible to perform a packet distribution according to the condition of each wireless channel.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus comprising:
a first wireless interface configured to communicate with a wireless terminal apparatus via a first radio link;
a second wireless interface configured to communicate with the wireless terminal apparatus via a second radio link;
a network interface configured to receive packet flows from a core network, each of the packet flows including reception packets; and
a processor configured
to identify a specified packet flow among the packet flows based on a header of the reception packets from the core network, the header of the reception packets including information that the reception packets are to be transmitted by using a link aggregation of the first radio link and the second radio link,
to generate encapsulated packets by adding link aggregation information to the reception packets which are included in the specified packet flow, the link aggregation information indicating that the specified packet flow are to be transmitted via the link aggregation, and
to distribute the encapsulated packets via link aggregation on the first wireless interface and the second wireless interface, in accordance with determination of whether a usage rate on each of the first and second radio links is greater than one or more respective thresholds for usage rate or whether radio quality for one or more of the first and second radio links is greater than one or more respective thresholds for radio quality.

2. The base station apparatus according to claim 1, wherein link aggregation information is a common destination address between the first radio link and the second radio link, which is included in an additional packet header.

3. The base station apparatus according to claim 1, wherein the processor is further configured
to control the first wireless interface and the second wireless interface such that uplink packets are received by the link aggregation of the first radio link and the second radio link,
to control the network interface to transmit the uplink packets from which the link aggregation information is removed, based on destination addresses included in packet headers of the uplink packets.

4. The base station apparatus according to claim 3, wherein sequence numbers indicating orders of the uplink packets are attached to the uplink packets.

5. The base station apparatus according to claim 4, wherein the processor is configured to the network interface to transmit the uplink packets, as to put the sequence numbers attached to the uplink packets in order.

6. A base station apparatus comprising:
a first wireless interface configured to communicate with a wireless terminal apparatus via a first radio link;
a second wireless interface configured to communicate with the wireless terminal apparatus via a second radio link;
a first network interface configured to receive packet flows comprising first reception packets from a first core network;
a second network interface configured to receive the packet flows comprising second reception packets from a second core network; and
a processor configured
to identify a specified packet flow among the packet flows based on a header of the first and second reception packets from the first and second core network, the header of each of the first and second reception packets including information that each of the first and second reception packets is to be transmitted by using a link aggregation of the first radio link and the second radio link, the specified packet flow including first reception packets and second reception packets, the first reception packets being received by the first network interface and including encapsulated packet headers whose destination addresses are first address, the second reception packets being received by the second network interface and including encapsulated packet headers whose destination addresses are second address which is different from the first address, to generate encapsulated packets by replacing the first address of the first reception packets with the second address or the second address of the second reception packets with the first address, and to distribute the encapsulated packets via link aggregation on the first wireless interface and the second wireless interface, in accordance with a determination of whether a usage rate on each of the first and second radio links is greater than one or more respective thresholds for usage rate or whether radio quality for one or more of the first and second radio links is greater than one or more respective thresholds for radio quality.

7. The base station apparatus according to claim 6, wherein the processor is further configured to control the first wireless interface and the second wireless interface such that uplink packets are received by the link aggregation of the first radio link and the second radio link, to control the network interface to transmit the uplink packets from which link aggregation information is removed, based on destination addresses included in packet headers of the uplink packets.

8. The base station apparatus according to claim 6, wherein the processor is further configured to delay the first reception packets or the second reception packets whose delay time is smaller.

9. The base station apparatus according to claim 1, wherein to identify a specified packet flow among the packet flows is based upon a header of the reception packets from the core network.

10. The base station apparatus according to claim 1, wherein the distribution of the encapsulated packets further comprises determining a distribution ratio of the first wireless interface and the second wireless interface, based on the usage rate.

11. The base station apparatus according to claim 1, wherein to distribute the encapsulated packets by link aggregation is based on the radio quality and the usage rate on each of the first and second radio links.

12. The base station apparatus according to claim 1, wherein the radio quality of the first and second radio links is determined prior to determination of a distribution ratio based on the usage rate on the first second radio links.

13. The base station apparatus according to claim 6, wherein to identify a specified packet flow among the packet flows is based upon a header of the reception packets from the core network.

14. The base station apparatus according to claim 6, wherein the distribution of the encapsulated packets further comprises determining a distribution ratio of the first wireless interface and the second wireless interface, based on the usage rate.

15. The base station apparatus according to claim 6, wherein to distribute the encapsulated packets by link aggregation is based on the radio quality and the usage rate on each of the first and second radio links.

16. The base station apparatus according to claim 6, wherein the radio quality of the first and second radio links is determined prior to determination of a distribution ratio based on the usage rate on the first second radio links.

* * * * *